United States Patent [19]
Yoshii et al.

[11] Patent Number: 5,477,554
[45] Date of Patent: Dec. 19, 1995

[54] PHASE SHIFT DEVICE AND LASER APPARATUS UTILIZING THE SAME

[75] Inventors: Minouru Yoshii, Tokyo; Kenji Saito, Yokohama; Masayuki Suzuki, Zama; Hiroshi Osawa, Yokohama, all of Japan

[73] Assignee: Canon Kabushiki Kaisha, Tokyo, Japan

[21] Appl. No.: 392,689

[22] Filed: Feb. 23, 1995

Related U.S. Application Data

[63] Continuation of Ser. No. 299,886, Sep. 1, 1994, abandoned, which is a continuation of Ser. No. 759,924, Sep. 13, 1991, abandoned.

[30] Foreign Application Priority Data

Sep. 14, 1990 [JP] Japan .................................. 2-244693
Sep. 14, 1990 [JP] Japan .................................. 2-244696

[51] Int. Cl.[6] .................................................... H01S 3/10
[52] U.S. Cl. ............................ 372/9; 372/108; 372/7; 372/98
[58] Field of Search ............................ 372/64, 99, 108, 372/9, 98, 107, 7, 69

[56] References Cited

U.S. PATENT DOCUMENTS

| | | | |
|---|---|---|---|
| 3,045,530 | 7/1962 | Tsujiuchi | 88/14 |
| 3,573,654 | 4/1971 | Smiley | 372/7 |
| 3,839,108 | 10/1974 | Leinkram | 359/565 |
| 4,521,075 | 6/1985 | Obenschain et al. | 350/162.11 |
| 4,699,465 | 10/1987 | Rice et al. | 350/162.11 |
| 4,813,762 | 3/1989 | Leger et al. | 359/565 |
| 4,879,721 | 11/1989 | Braski et al. | 372/108 |
| 4,903,271 | 2/1990 | Yasui et al. | 372/9 |
| 5,007,066 | 4/1991 | Eda | 372/69 |
| 5,058,123 | 10/1991 | Yasui et al. | 372/99 |
| 5,124,843 | 6/1992 | Leger et al. | 359/565 |

FOREIGN PATENT DOCUMENTS 293907 12/1988 European Pat. Off. .
3240360 5/1984 Germany .

OTHER PUBLICATIONS

"Modulieren der Grösse eines Einschreibefleckens für optische Aufziechnungsträger", Neues Aus Der Technik, No. 3, Aug. 15, 1985, Würzburg, Deutschland.

*Primary Examiner*—Leon Scott, Jr.
*Attorney, Agent, or Firm*—Fitzpatrick, Cella, Harper & Scinto

[57] ABSTRACT

A phase shift device for a laser beam has a circular first area transparent so the laser beam and a second area provided around the first area and transparent to the laser beam. The first and second areas generate a phase difference for example 180° in the passing light beams. The phase shift device is positioned for example at a beam waist of a laser scanning apparatus to form a beam spot of a diameter smaller than that defined by the numerical aperture of the imaging optical system. Structure of a laser apparatus employing such phase shift device is also disclosed.

37 Claims, 19 Drawing Sheets

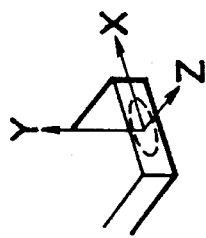
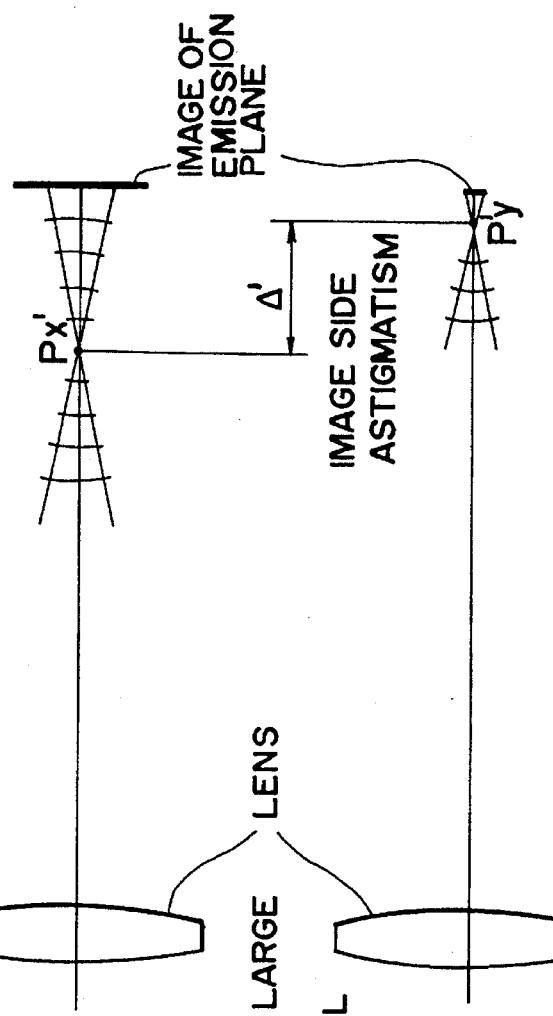
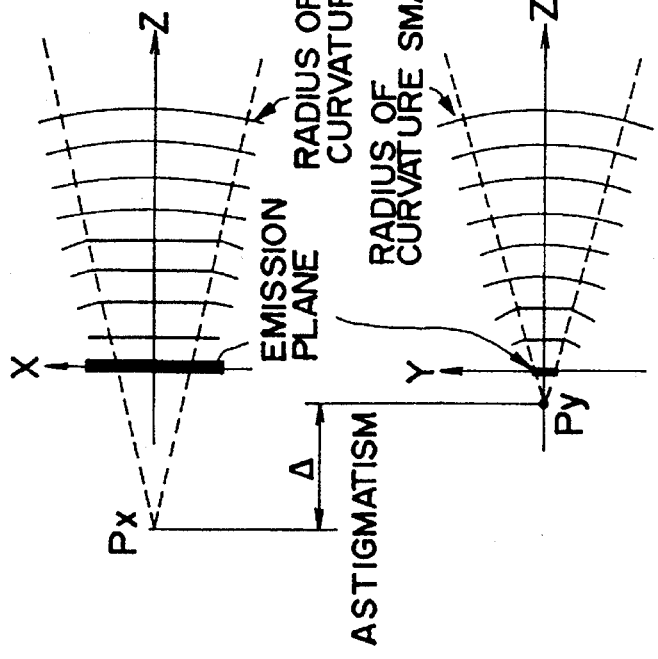
FIG. 2A PRIOR ART
FIG. 2B PRIOR ART

PHASE SHIFT DEVICE AND LASER APPARATUS UTILIZING THE SAME

This application is a continuation of application Ser. No. 08/299,886 filed Sep. 1, 1994, now abandoned, which is a continuation of application Ser. No. 07/759,924 filed Sep. 13, 1991, now abandoned.

BACKGROUND OF THE INVENTION

1. Field of the Invention

The present invention relates to a phase shift device and a laser apparatus utilizing the same, and more particularly to a phase shift device for dividing a passing area of a laser beam into plural areas and giving a predetermined phase difference between the laser beams passing through the areas, thereby regulating the beam spot diameter of the laser beam for the purpose of image formation of a high precision or correcting astigmatism of the laser beam, and a laser apparatus employing such phase shift device.

2. Related Background Art

In recent laser apparatus for input/output of image information utilizing the laser beam, there is desired capable for forming or reproducing image information with a high resolving power.

A high resolving power can be achieved, in the formation or reproduction of image information, by reducing the beam spot diameter of the laser light (laser beam) at the image input or output, and it is already known that a reduction in the beam spot diameter can be achieved by the use of an optical system with a large numerical aperture (NA).

FIG. 1 is a schematic view of a conventional optical scanning apparatus employed, for example, in a laser beam printer.

Referring to FIG. 1, a laser beam emitted from a light source unit 91 consisting, for example, of a laser is converted into a substantially parallel beam by a collimating lens 92, and enters a rotary polygon mirror 93. The mirror 93 is rotated in a direction indicated by an arrow, with a constant high speed, whereby the laser beam, entering a point P on a reflection face 93a of the rotary polygon mirror 93 is reflected and put into a scanning motion on a main scanning plane, thus entering an f-θ lens 94 constituting a focusing optical system. Emerging from the lens 94, the laser beam is focused onto a scanned plane 95 and scans the plane linearly with a substantially constant speed.

For example, in an image formation on the scanned plane composed for example of a photosensitive member, a higher resolving power can be attained by increasing the numerical aperture of the f-θ lens system 94 thereby reducing the diameter of the beam spot 96 focused on the scanned plane 95.

However an optical system with a large NA is very difficult to construct, and NA=1 cannot be exceeded in theory by an optical system in air. Also an increase in the NA drastically reduces the depth of focus, whereby the positional tolerance of image plane becomes narrower, thus rendering the manufacture and adjustment of the apparatus extremely difficult.

In general, the beam spot diameter and depth of focus on the image plane in a laser apparatus employing a laser light source are given by the following equations:

$$\text{Spot diameter} = k\lambda/(2 \cdot NA) \quad \text{(a)}$$

$$\text{Depth of focus} = \pm\lambda/(2 \cdot NA^2) \quad \text{(b)}$$

wherein $\lambda$ is wavelength, k is a constant ($k \geq 1.64$) indicating the level of beam intensity in the pupil periphery of the imaging optical system, and the beam spot diameter is $1/e^2$ of the peak intensity.

As an example, Tab. 1 shows the beam spot diameter and depth of focus on the scanned plane, for different values of NA calculated with $\lambda = 0.78$ μm and k=1.7 in the equations (a) and (b).

TABLE 1

| NA of optical system | Spot diameter (μm) | Depth of focus (μm) | Remark |
|---|---|---|---|
| 0.01 | 66.36 | ±3900 | Laser beam printer |
| 0.02 | 33.15 | ±975 | |
| 0.05 | 13.26 | ±156 | |
| 0.1 | 6.63 | ±39 | |
| 0.5 | 1.33 | ±1.56 | Objective lens for optical disk |
| 0.95 | 0.70 | ±0.43 | Objective lens for microscope |
| 1.0 | 0.66 | ±0.39 | Limit value |

Also the semiconductor laser employed as the light source in the laser apparatus is associated with astigmatism because of the structure thereof. More specifically, as shown in FIG. 2A, the size of the light emission area is different in a direction parallel to the junction plane of semiconductor device (x-direction) and in a direction perpendicular thereto (y-direction). Consequently the radius of curvature of the wave front at a distant point from the laser light source is different in the parallel direction and the perpendicular direction, as shown in FIG. 2B.

For this reason, when the light beam from the laser light source is focused by an axis-symmetrical lens system, there result different best focus positions Px', Py' respectively in the x- and y-directions, thus giving rise to a so-called astigmatism $\Delta$ or $\Delta'$.

Conventionally the astigmatism is corrected by positioning a cylindrical lens in the optical path and adjusting the position thereof.

For example in the laser apparatus for use in a laser beam printer, as shown in Tab. 1, the depth of focus becomes smaller than ±1 mm if the numerical aperture of the imaging optical system is 0.02 or larger, namely if the spot diameter becomes 33 μm or smaller.

In general, with a depth of focus equal to or smaller than ±1 mm, the manufacture of apparatus becomes extremely difficult as the positional setting or planarity of the photosensitive member becomes critical. Consequently it is generally difficult to select a numerical aperture in excess of 0.02 for the imaging optical system.

Also in the objective lens for optical disk or for microscope, a beam spot diameter of about 0.7 μm is generally considered as a limit, as a smaller diameter is theoretically difficult to achieve.

As explained in the foregoing, it has been very difficult theoretically and mechanically, to obtain a laser beam of a small spot diameter in the conventional laser apparatus.

Also the correction of astigmatism, resulting when an axis-symmetrical lens system is combined with a semiconductor laser, with a cylindrical lens requires a large curvature, so that the manufacture of the cylindrical lens becomes difficult.

SUMMARY OF THE INVENTION

The object of the present invention is to provide a phase shift device which divides a passing area of a laser beam into plural areas and provides the laser beam passing through the plural areas with predetermined phase difference thereby providing a laser beam of a smaller beam spot diameter while maintaining a large depth of focus without change in the numerical aperture of the imaging optical system, and which is adapted to be placed in an appropriate position in the optical path thereby satisfactorily correcting the astigmatism of the laser light source, and a laser apparatus employing the phase shift device.

The phase shift device of the present invention is featured by a first area transparent to the light of a predetermined wavelength and a second area provided around the first area and generating a predetermined phase difference with respect to the light passing through the first area, and it is also featured by a fact that the phase difference is 180°.

Also the laser apparatus of the present invention is featured by the presence, in the vicinity of a light emitting end face of a laser light source or in the vicinity of a position conjugate with the light emitting end face or in the vicinity of a beam waist of the laser beam emitted from the laser light source, a phase shift device having a first area transparent to the laser beam and a second area formed around the first area and generating a predetermined phase difference with respect to the laser beam passing through the first area. It is further featured by a fact that the laser light source is composed of a semiconductor laser or a gas laser, and that the beam waist is formed by condensing the laser beam emitted by the laser light source by a condensing optical system.

BRIEF DESCRIPTION OF THE DRAWINGS

FIGS. 2A and 2B are views showing astigmatism in a conventional semiconductor laser;

DESCRIPTION OF THE PREFERRED EMBODIMENTS

Figure 1:
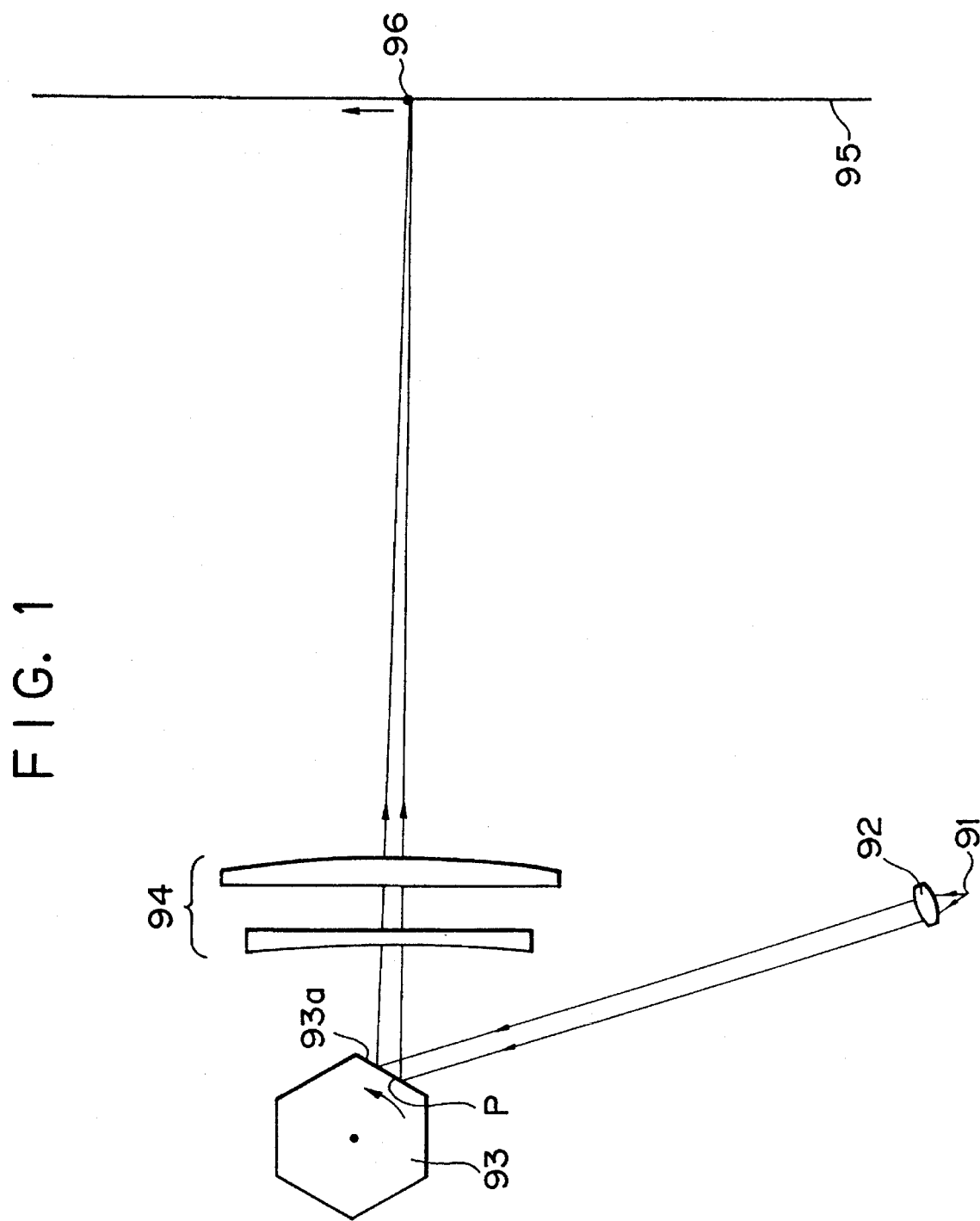
FIG. 1 is a schematic view of a conventional laser apparatus.
Figure 3A:
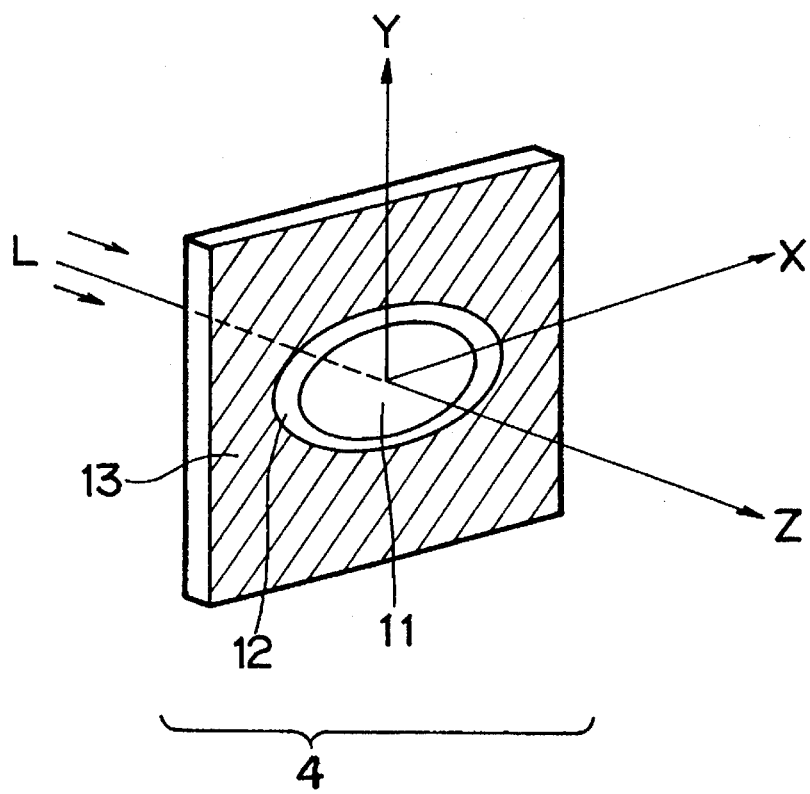
FIGS. 3A and 3B are partial schematic views of a phase shift device of the present invention.
Figure 3B:
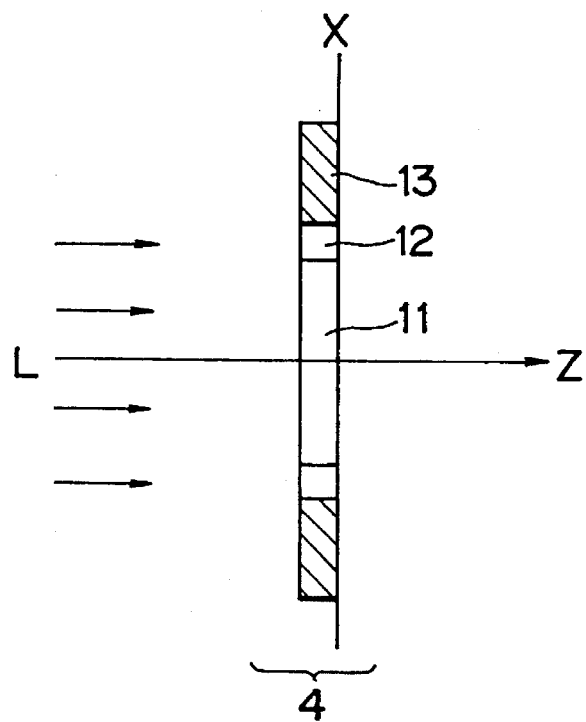

FIG. 3A is a schematic perspective view of an embodiment of the phase shift device of the present invention, and FIG. 3B is a cross-sectional view thereof along a plane containing a central (optical) axis.

In these drawings there are shown a phase shift device 4; a first area 11 formed in circular or oval form about the optical axis and transparent to the light (laser light L) of a predetermined wavelength; a second area 12 of a circular or oval ring form provided around and immediately adjacent to the first area and transparent to the laser light L; and a light shield area 13 surrounding the second area 12 and opaque to the laser light L.

Thus, the light transmissing part of the phase shift device 4 is divided into two transparent areas, i.e. the first area 11 and the second area 12, and a predetermined phase difference is given between two beams passing respectively through the two areas 11, 12.

The present embodiment is so designed that the laser beam passing through the second area 12 has an optical path length longer by a half wavelength than that of the laser beam passing through the first area 11.

Thus the phase shift device 4 splits the passing light beam into two beams respectively passing through the first area 11 and the second area 12, and generates a phase difference of 180° between the two beams.

Such phase shift device can be relatively easily manufactured. It can be prepared, for example, by employing a parallel-faced flat glass plate with precisely ground surfaces as a substrate, forming a thin film of a thickness of $d=\lambda/\{2(n-1)\}$ by vacuum evaporation only in the second area 12 or the first area 11, wherein $\lambda$ is the wavelength of the laser beam and n is the refractive index of evaporated substance, and coating the light shield area with a light-absorbing paint.

In the following there will be explained principle of reduction of the beam spot diameter by the phase shift device.

Figure 4A:
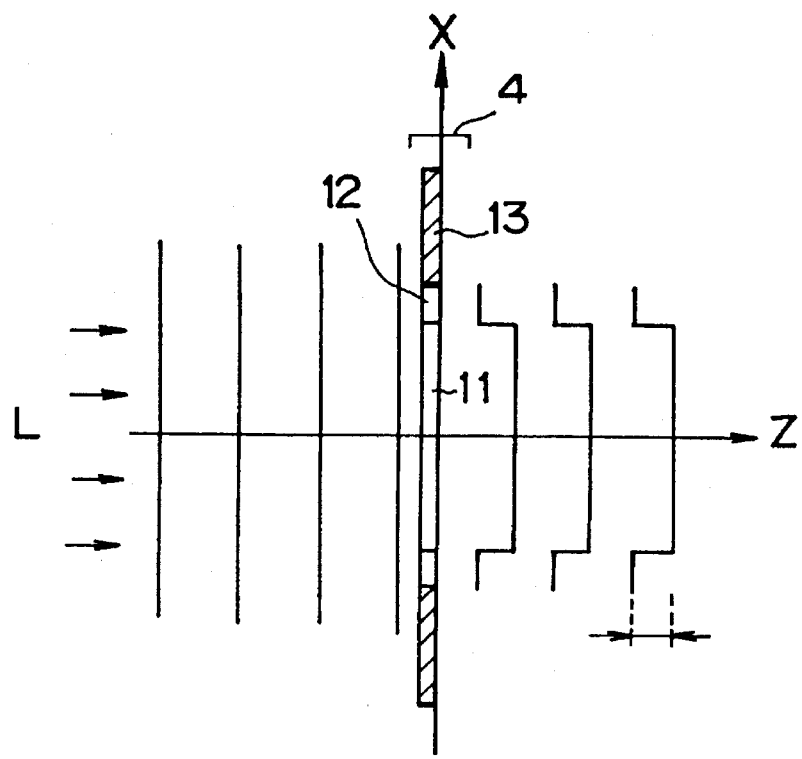
FIGS. 4A and 4B are schematic views showing the state of wave front of the light beam passing through the phase shift device of the present invention.
Figure 4B:
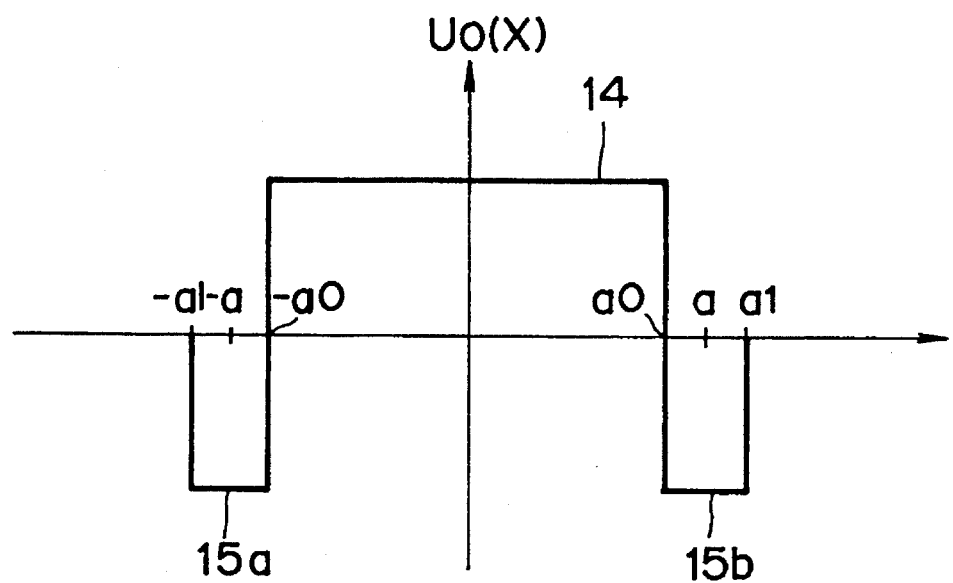

FIGS. 4A and 4B show state of wave front and amplitude distribution when a light beam of planar wave enters and is transmitted by the phase shift device 4 of the present embodiment. Such situation is obtained when the phase shift device 4 is positioned in the vicinity of the beam waist of laser beam in a laser apparatus.

There are conceptually illustrated wave 10 fronts of the light beams, respectively passing through the first and second areas 11, 12 with a predetermined phase difference therebetween, when a laser beam of planar wave enters the phase shift device 4 from the left in the drawing.

As the phase shift device 4 is positioned in the vicinity of the beam waist, the laser beam entering from the left assumes a state of substantially planar wave at the entrance face, as shown in FIG. 4A. Because of a difference in optical path length of a half wavelength between the planar wave passing through the first area 11 and that passing through the second area 12, the wave front of the beam emerging from the phase shift device 4 assumes a form illustrated in the drawing. Consequently the complex amplitude distribution of the laser beam immediately after emerging from the device 4 assumes the form shown in FIG. 4B.

In FIG. 4B, x indicates the coordinate in a direction perpendicular to the optical axis, $U_0(x)$ is the complex amplitude distribution of the laser beam at a coordinate x, 14 indicates the complex amplitude distribution of the beam transmitted by the first area 11 of the phase shift device 4, 15a and 15b are those of the beam transmitted by the second area 12 of the device 4.

Though $U_0(x)$ is a complex number, it can be represented by the real number axis only as shown in FIG. 4B because the imaginary component becomes zero as the phase is limited to 0° and 180° only. For the purpose of simplicity, the intensity of laser beam is assumed to be constant regardless of the coordinate x.

In the following there will be explained the intensity distribution on the image plane, when the phase shift device 4, regarded as an object plane, is imaged by an optical system without aberrations. Again for the purpose of simplicity, the phase shift device is assumed to be a one-dimensional device extending along the x-direction and the magnification of the optical system is assumed to be unity.

Figure 5A:
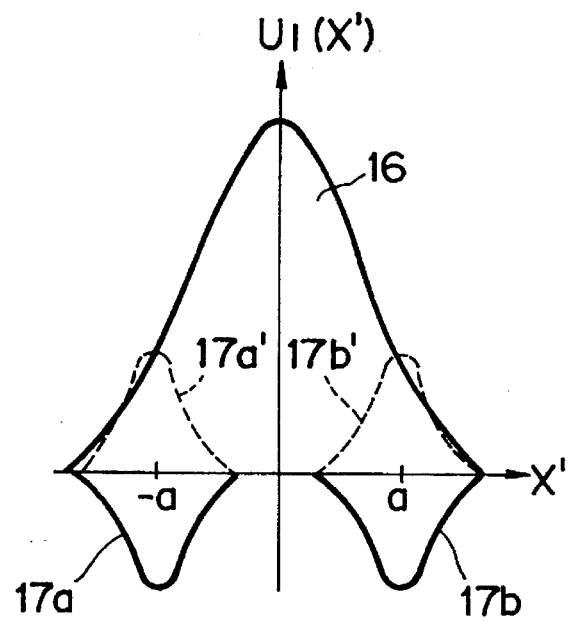
FIGS. 5A to 5C are charts showing complex amplitude distribution and intensity distribution on the image plane, of the light beam passing through the phase shift device of the present invention.

If the optical system has an infinitely large numerical aperture, the complex amplitude distribution on the object plane, shown in FIG. 4B, is reproduced on the image plane. However, because the numerical aperture is finite in reality, there is generated a spreading due to diffraction, thus providing a complex amplitude distribution $U_1(x')$ as shown in FIG. 5A on the image plane, wherein x' is the x-coordinate on the image plane, and 16, 17a and 17b are complex amplitude distributions respectively corresponding to 14, 15a, 15b in FIG. 4B. This can be mathematically explained as follows. 10 The complex amplitude distribution $U_1(x')$ on the image plane can be represented by the following equation, utilizing the complex amplitude distribution $U_0(x)$ on the object plane and the complex point image amplitude distribution $K(x')$:

$$U_1(x')=\int U_0(x)\cdot K(x'-x)dx \quad (1)$$

If $U_0$ can be approximated by a group of three point light sources of different phases, there is obtained the following relation utilizing Dirac's delta function $\delta(x)$:

$$U_0(x)=C\cdot\delta(x)-\delta(x-a)-\delta(x+a) \quad (2)$$

wherein a is the distance from the optical axis to the center of the complex amplitude distribution 15a or 15b, and C is a constant corresponding to the ratio of the energy in the complex amplitude portion 14 to that in the complex amplitude portion 15a or 15b. By substitution with the equation (2), the equation (1) can be transformed as:

$$U_1(x')=C\cdot K(x')-K(x'+a)-K(x'-a) \quad (3)$$

so that the complex amplitude distribution on the image plane can be represented by the sum of three complex point image amplitude distributions. In the equation (2), the first, second and third terms in the light-hand side respectively correspond to the complex amplitude distributions 16, 17a, 17b in FIG. 5A. For the purpose of simplicity, the distributions 16, 17a and 17b are shown without smaller second-order peaks. In case the above-explained approximation of regarding the object plane as a group of three point light source does not stand, the complex amplitude distribution $U_0(x)$ of the object plane can be given as follows, taking the intensity on the object plane as unity:

$$U_0(x) = \begin{cases} 1 & (-a_0 < x < a_0) \\ -1 & (-a_1 < x < -a_0, a_0 < x < a_1) \\ 0 & (x < -a_1, a_1 < x) \end{cases} \quad (4)$$

wherein $a_0$ is the distance from the optical axis to the boundary between the first area 11 and the second area 12, and $a_1$ is the distance from the optical axis to the boundary between the second area 12 and the light shield area 13. By substitution of the equation (4) into (1), the complex amplitude distribution $U_1(x')$ on the image plane can be represented as:

$$U_1(x')=\int_{-a_0}^{a_0} K(x'-x)dx - \int_{-a_1}^{-a_0} K(x'-x)dx - \int_{a_0}^{a_1} K(x'-x)dx \quad (5)$$

wherein the first, second and third terms on the right-hand side respectively correspond to the complex amplitude distributions 16, 17a and 17b in FIG. 5A.

In summary, when an object with a complex amplitude distribution as shown in FIG. 4B is imaged with an optical system, the complex amplitude distribution on the image plane can be represented by the sum of three complex amplitude distributions 16, 17a and 17b shown in FIG. 5A.

In FIG. 5A, curves 17a' and 17b' are obtained by inverting the complex amplitude distribution curves 17a, 17b about x' axis, and can be used for comparing with the curve 16 for determining the amplitude. It will be apparent from FIG. 5A that the curve 16 approximately overlaps with the curves 17a' and 17b' in the end slope portions thereof, and such relationship is preferable for obtaining a small spot diameter.

Figure 5B:
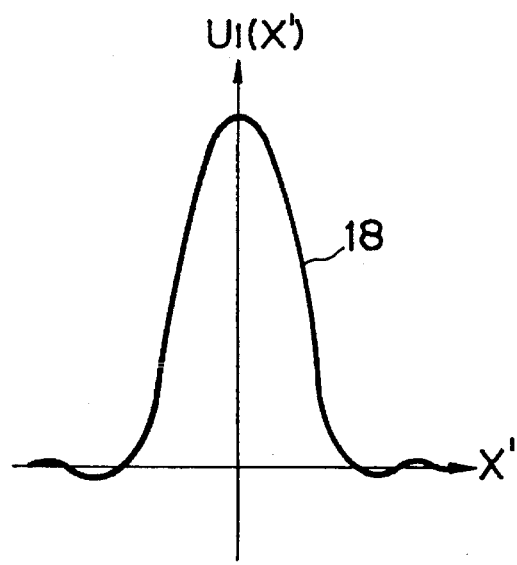

A curve 18 in FIG. 5B shows a complex amplitude distribution, corresponding to the sum of three complex amplitude distributions 16, 17a and 17b in FIG. 5A. In comparison with the curve 16, the curve 18 shows a reduced spreading in the x' direction.

Figure 5C:
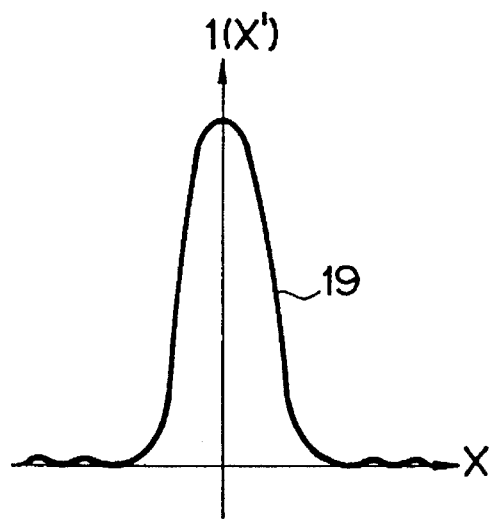

A curve 19 in FIG. 5C shows the intensity distribution on the image plane. The intensity distribution $I(x')$ can be obtained from the complex amplitude distribution $U_1(x')$ by the following equation:

$$I(x')=U_1^*(x')\cdot U_1(x')=|U_1(x')|^2 \quad (6)$$

In the present embodiment, as explained in the foregoing, a phase shift device as shown in FIGS. 3A and 3B is positioned in the vicinity of the beam waist of a laser beam, and the imaging with an optical system provides a spot diameter smaller than that defined by the F-number or numerical aperture of the optical system.

In the following there will be explained principle of correction of astigmatism of the semiconductor laser by the phase shift device of the present invention, based on the result of a simulation.

Figure 6A:
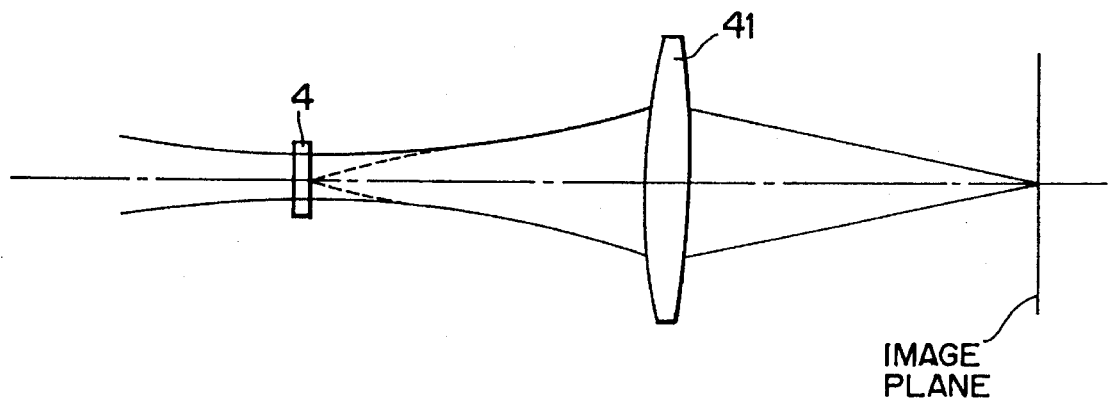
FIGS. 6A and 6B are views showing simulation of an optical system for correcting the astigmatism of laser beam, utilizing the phase shift device of the present invention.
Figure 6B:
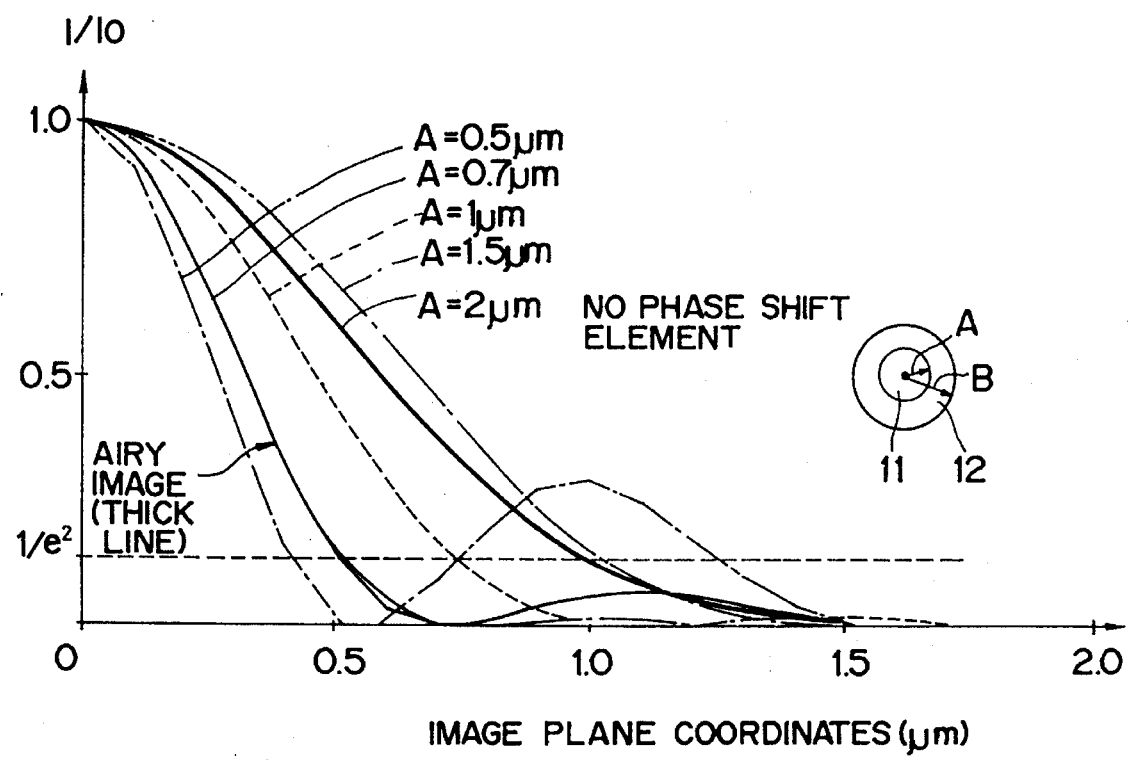

FIG. 6A is a schematic view of the phase shift device 4 positioned in the vicinity of the beam waist of a laser beam, and FIG. 6B is a chart showing the result of simulation of intensity distribution on the image plane, obtained by an imaging lens 41 of no aberrations.

In the present embodiment, for the purpose of simplicity, calculation is made on a system of rotational symmetry. Thus, in FIG. 6B, there is assumed a phase shift device of concentric structure, composed of a first area 11 of a radius A from the optical axis and a second area 12 of a radius B positioned outside, with a phase difference of 180° between the passing light beams. A light shield area is formed outside the second area. Such phase shift device 4 is positioned in the vicinity of a beam waist formed by condensing a laser beam, and is imaged by an imaging lens which is assumed to be free from aberrations.

The simulation for determining the intensity distribution on the image plane was conducted on the usual diffraction theory, with a radius $W_0$ of the beam waist, a wavelength $\lambda$ of the laser light, and an effective number $F_{NO}$ of the imaging lens at the image plane side.

FIG. 6B shows the intensity distributions on the image plane when A is varied from 0.5 to 2.0 μm, under the conditions of $W_0$=1.0 μm, $\lambda$=0.6328 μm, $F_{NO}$=1.0 and B=2.0 μm. The intensity distribution is normalized at the maximum value, and the parameters $W_0$, A and B are represented by the dimensions on the image plane, obtained by the actual dimensions multiplied by the magnification of the imaging lens.

As shown in FIG. 6B, in case of A=2 μm, there is obtained a relation A=B. This case corresponds to a mere insertion of an aperture, without area of phase inversion. In such case, the original point of divergence of light is different from the position of the phase shift device, as can be predicted from FIG. 2B, so that the beam spot diameter can be reduced to a certain extent by displacing the image plane. At the radius A=1 μm, the spot diameter on the image plane becomes smaller due to the effect of phase inversion. At the radius A=0.7 μm, the beam spot diameter on the image plane becomes even smaller and approximately coincides with the Airy pattern of the imaging lens. The Airy pattern is a diffraction image formed on the image plane, when a point light source is imaged by a rotationally symmetrical imaging lens assumed to be free from aberrations. Thus, the case of A=0.7 μm can be considered to correspond to an imaginary point light source positioned at the phase shift device.

Consequently, the phase shift device can be considered to have an optical effect of shifting the light diverging point of the laser beam to the position of the device. Also it may be considered to have an effect of increasing the diverging angle of the laser beam, thereby introducing the laser beam into the entire effective diameter of the imaging lens and thus reducing the beam spot diameter.

As explained above, in case the optical system has rotational symmetry, the position of the light diverging point can be controlled by the phase shift device.

In case the beam spot diameter lacks rotational symmetry, as in the semiconductor laser, there can be considered two light diverging points Px, Py respectively in different cross section planes, as shown in FIG. 2B. Therefore, the use of phase shift device allows to shift the position of light diverging point to the position of the device in each cross section. Thus the originally different positions of the light diverging points in different cross sections can be brought to a same position.

Based on this principle, the present embodiment effects correction of the astigmatism of the semiconductor laser, by suitably selecting the radii A, B of the phase shift device and the position thereof in the optical path of the laser beam. The phase difference between the laser beams transmitted by the first area 11 and the second area 12 is not limited to 180° but can be selected arbitrarily.

Figure 7A:
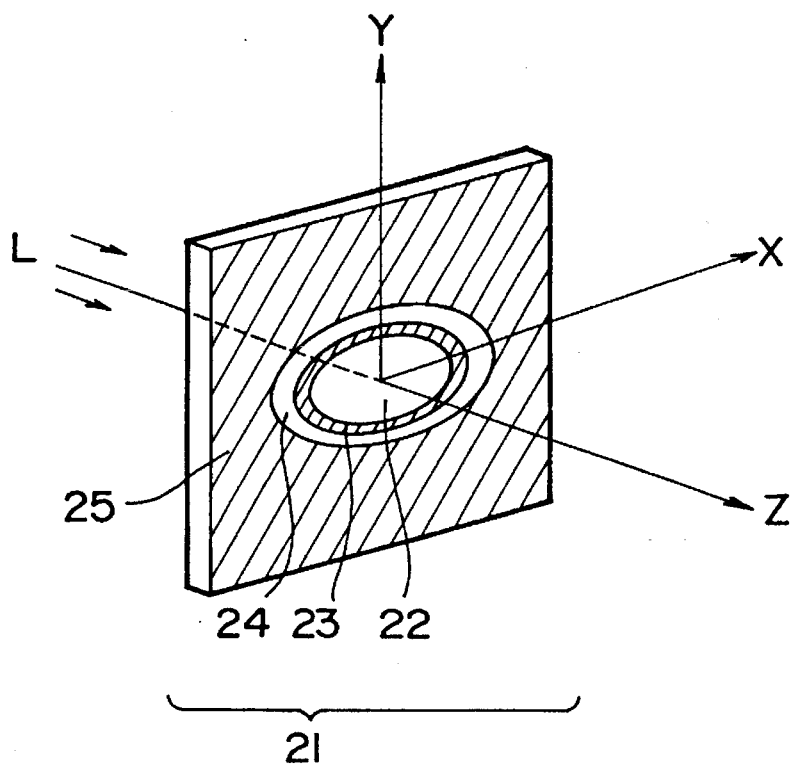
FIGS. 7A and 7B are partial schematic views of a phase shift device of the present invention.
Figure 7B:
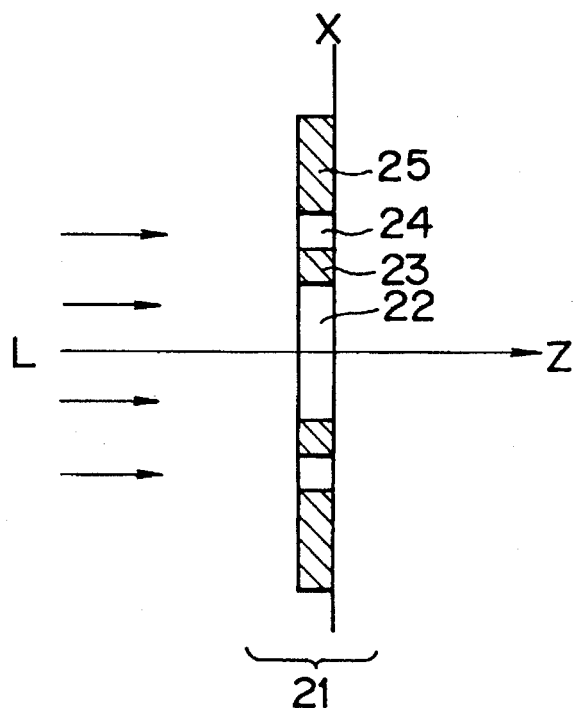

FIG. 7A is a schematic perspective view of another embodiment of the phase shift device of the present invention, and FIG. 7B is a cross-sectional view thereof along a plane including the central axis (optical axis) z.

Referring to FIGS. 7A and 7B there are shown a phase shift device 21; a first transparent area 22 formed in a circular or oval shape about the optical axis z and transparent to the laser light L of a predetermined wavelength; a first light shield area of an oval ring shape provided around the first transparent area 22 and opaque to the laser light L; a second transparent area 24 of an oval ring shape provided around the first light shield area and transparent to the laser light L; and a second light shield area 25 surrounding the second transparent area 24 and opaque to the laser light L.

Thus the light transmitting area of the phase shift device 21 is divided into two transparent areas 22, 24 across the first light shield area 23, and a predetermined phase difference is provided between two light beams passing through the two transparent areas 22 and 24.

The present embodiment is so designed that the optical path length of the light beam transmitted by the second transparent area 24 is longer, by a half wavelength, than that of the beam transmitted by the first transparent area 22. Thus the phase shift device splits the entering light beam into two light beams passing respectively through the first and second transparent areas, generating a phase difference of 180° therebetween.

Such phase shift device can be relatively easily manufactured. It can be prepared, for example, by employing a parallel-faced flat glass plate with precisely ground surfaces as a substrate, forming a thin film of a thickness of $d=\lambda/\{2(n-1)\}$ by vacuum evaporation only in the second transparent area, wherein $\lambda$ is the wavelength of the laser beam (laser light L) and n is the refractive index of evaporated substance, and coating the light shield areas with light-absorbing paint.

Figure 8:
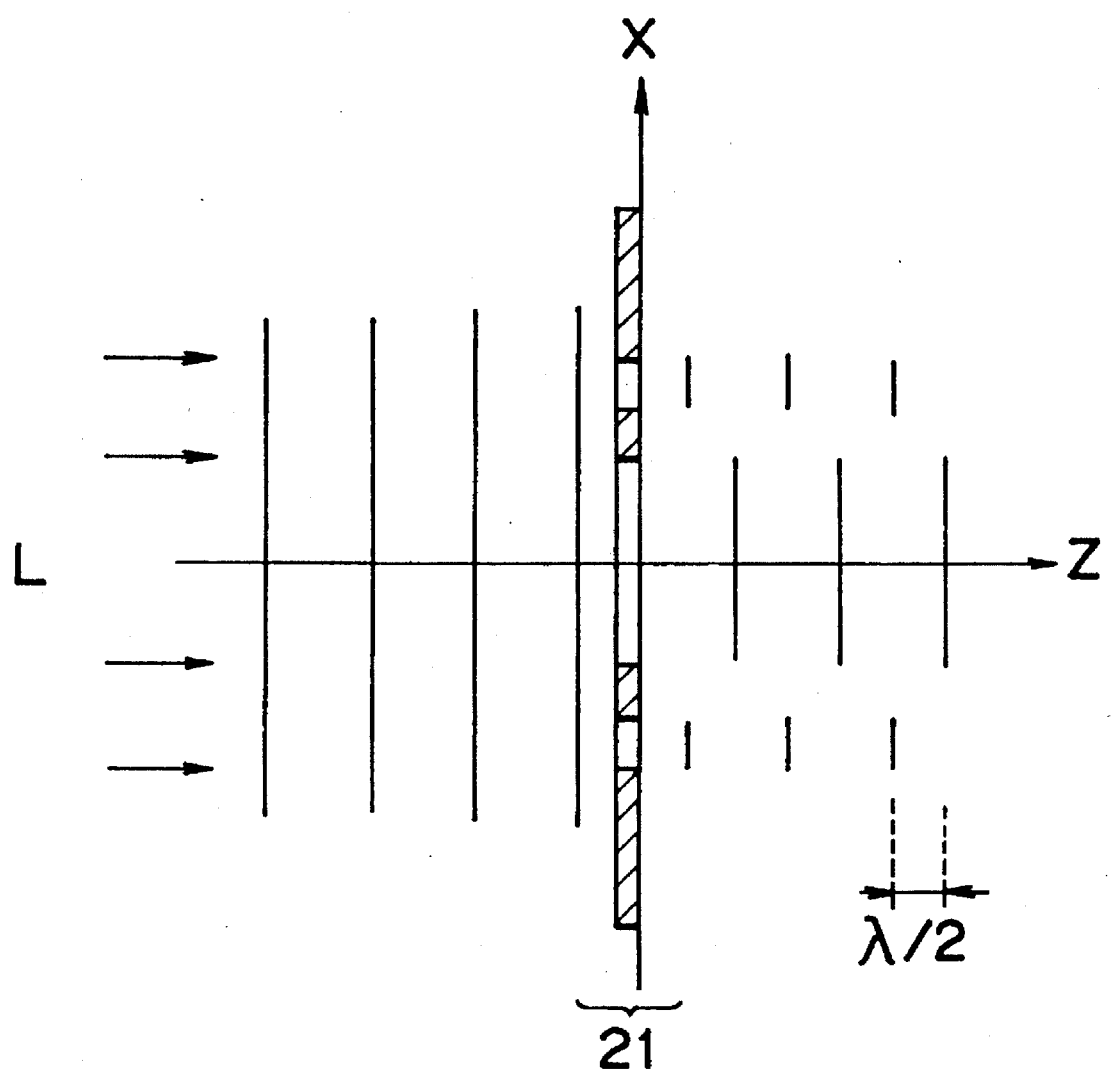
FIG. 8 is a schematic view showing the state of wave front in the vicinity of the phase shift device of the present invention.

FIG. 8 shows the state of wave front when a light beam of planar wave enters and is transmitted by the phase shift device 21 of the present embodiment. Such situation occurs when the phase shift device is positioned in the vicinity of the beam waist of a laser beam.

There are conceptually illustrated wave fronts of the light beams, transmitted by the first and second transparent areas 22, 24 and having a phase difference therebetween, when a laser beam of planar wave enters the phase shift device 21 from the left in the drawing.

Figure 9A:
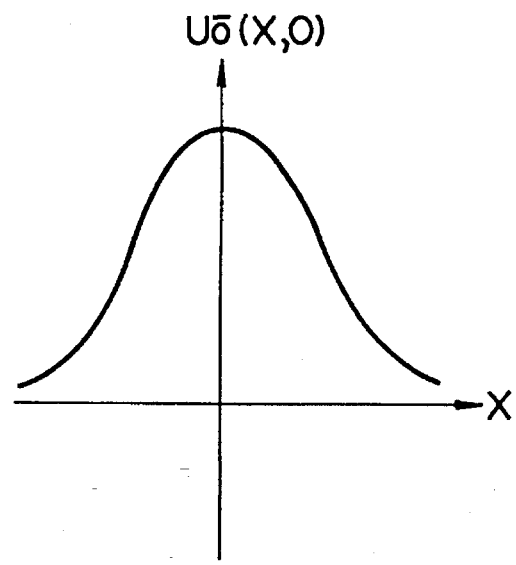
FIGS. 9A to 9C are charts showing complex amplitude distribution in the vicinity of the phase shift device of the present invention and transmittance of the device.
Figure 9B:
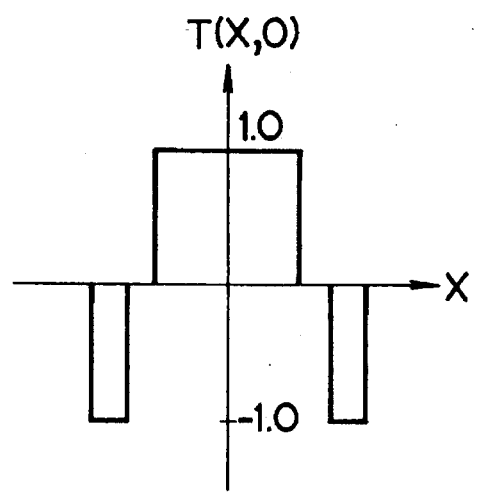
Figure 9C:
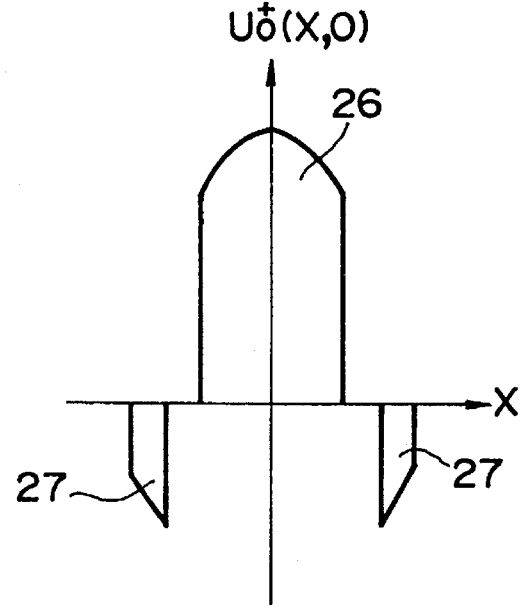

FIGS. 9A to 9C are charts showing complex amplitude distribution in the vicinity of the phase shift device 21 of the present embodiment when a light beam passes therethrough, and amplitude transmittance of the device. The phase shift device 21 has the amplitude transmittance T(x, 0) as shown in FIG. 9B, whereby a light beam with a complex amplitude distribution $U_0^-(x,0)$ as shown in FIG. 9A, when transmitted by the phase shift device 21, emerges with a complex amplitude distribution $U_0^+(x, 0)$ shown in FIG. 9C. For the purpose of simplicity, these charts show the distributions on the x-axis (y=0).

In FIG. 9C, curves 26, 27 respectively indicate the complex amplitude distributions of the light beams transmitted by the first and second transparent areas 22, 24.

Though these values are complex numbers, they can be represented by the real number axis only, because the imaginary components become zero as the phase is limited to 0° and 180°. Also the complex amplitude distribution immediately after emerging from the phase shift device is represented by the product of the complex amplitude distribution immediately before entering the device and the amplitude transmittance of the phase shift device 21, i.e.:

$U_0^+(x, 0) \times T(x, 0)$.

Figure 10:
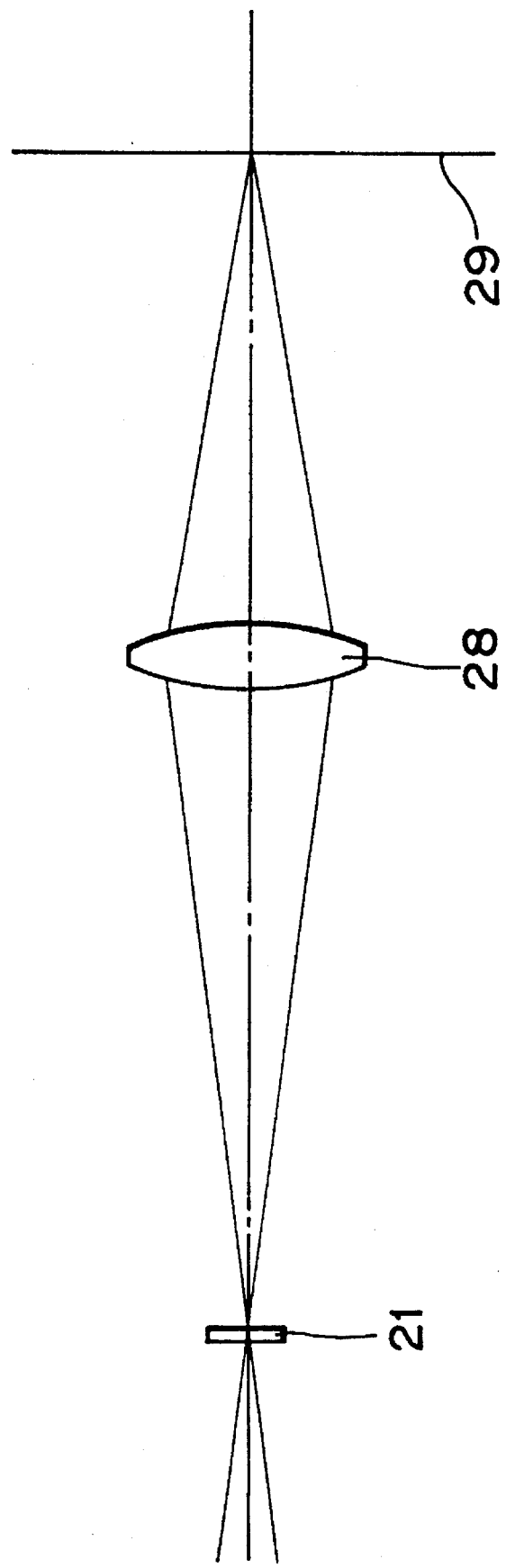
FIG. 10 is a schematic view showing positional arrangement of an optical system employing the phase shift device of the present invention.
Figure 11A:
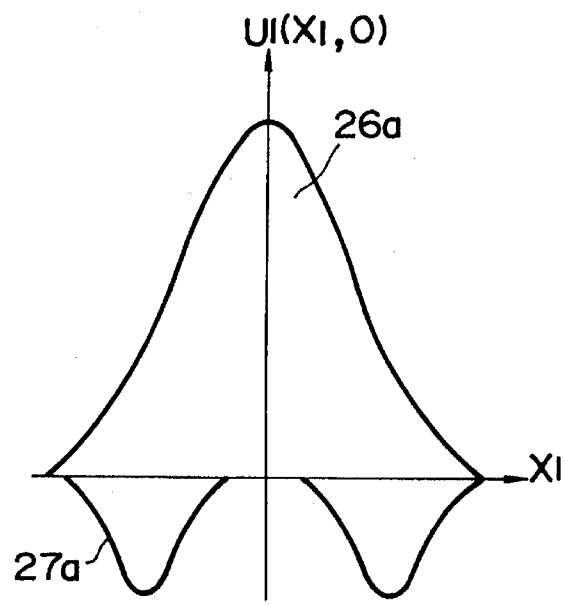
FIGS. 11A to 11C are charts showing complex amplitude distribution and intensity distribution on the image plane in FIG. 10.
Figure 11B:
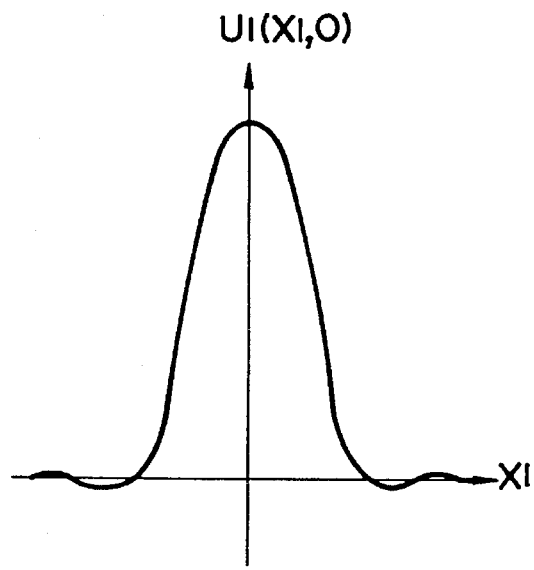
Figure 11C:
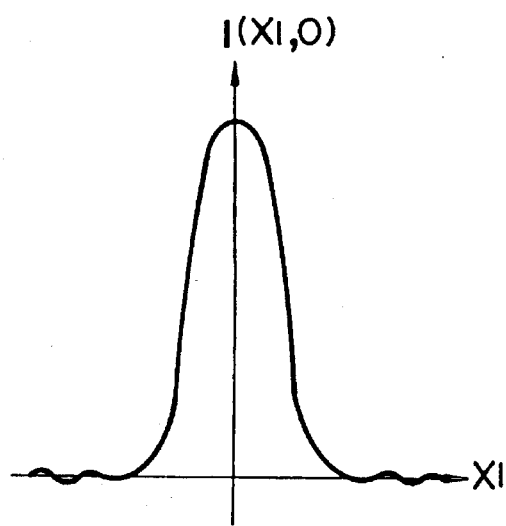

FIG. 10 is a schematic view when the phase shift device 21 is regarded as the object plane and is imaged by an imaging optical system onto a predetermined plane (an image plane), and FIGS. 11A to 11C are charts showing complex amplitude distribution and intensity distribution on the image plane 29 in the optical system shown in FIG. 10.

In FIG. 10, a light beam emitted from an unrepresented light source such as a laser is introduced in a planar wave state into the phase shift device 21, and is focused on an image plane 29 by an imaging optical system 28, regarding the phase shift device 21 as an object plane. The complex amplitude distribution on the object plane (FIG. 9C) is reproduced on the image plane in case the imaging optical system 28 has an infinitely large numerical aperture. The distribution is, however, enlarged or reduced according to the magnification of the optical system 28, and is normalized at the central value.

However, since the numerical aperture of the imaging optical system 28 is finite in reality, there is generated spreading by diffraction whereby a complex amplitude distribution $U_1(x_1, y_1)$ shown in FIG. 11A is generated on the image plane 29, wherein $x_1, y_1$ are coordinates on the image plane 29. FIGS. 11A to 11C illustrate distributions on the $x_1$-axis ($y_1=0$).

The amplitude distributions 26a, 27a in FIG. 11A respectively correspond to those 26, 27 in FIGS. 9A–9C, and can be mutually added as the light beams originate from a same laser and are coherent. FIG. 11B shows the result of addition, in which the amplitude distribution shows a narrower spreading because of mutual cancellation of the distributions 26a and 27a. FIG. 11C shows the intensity distribution $I(x_1, y_1)$ on the $x_1$-axis, obtained as the square of absolute value of the complex amplitude distribution $U_1(x_1, y_1)$. The intensity distribution shows a narrower spreading in comparison with a case in which the light beam from the light source is focused onto the image plane 29 with the imaging optical system of a same numerical aperture and without the phase shift device 21.

The above-explained situation can be mathematically explained as follows. In the following description, the phase shift device 21 is regarded as the object plane, and the coordinate (x, y) on the object plane is represented by the actual dimension multiplied by the magnification of the optical system 28. Thus the amplitude distribution $U_0(x, y)$ on the object plane and that $U_1(x, y)$ on the image plane 29 can be correlated as follows:

$$U_1(x', y') = \int_{-\infty}^{+\infty} \int_{-\infty}^{+\infty} U_0^+(x, y) k(x' - x, y' - y) dx dy.$$

This equation corresponds to the equation (2a) in "Principles of Optics" by Born and Wolf, Section 9.5.

In this equation, k is the transmission function of the optical system 28 (complex amplitude distribution on the image plane by a point light source), and can be represented by an equation including a Bessel function, in case of an aberration-free optical system with a circular aperture.

Also the intensity distribution can be given, as explained before, by:

$I(x_1, y_1) = |U_1(x_1, y_1)|^2$.

The present embodiment provides a difference of a half wavelength in the optical path length between the light beams transmitted by the first and second transparent areas, thereby generating a phase difference of 180°, but such difference is not limitative and the difference in the optical path length may be suitably varied according to the phase difference required.

In the following there will be explained various embodiments of the laser apparatus employing the phase shift device of the present embodiment.

Figure 12:
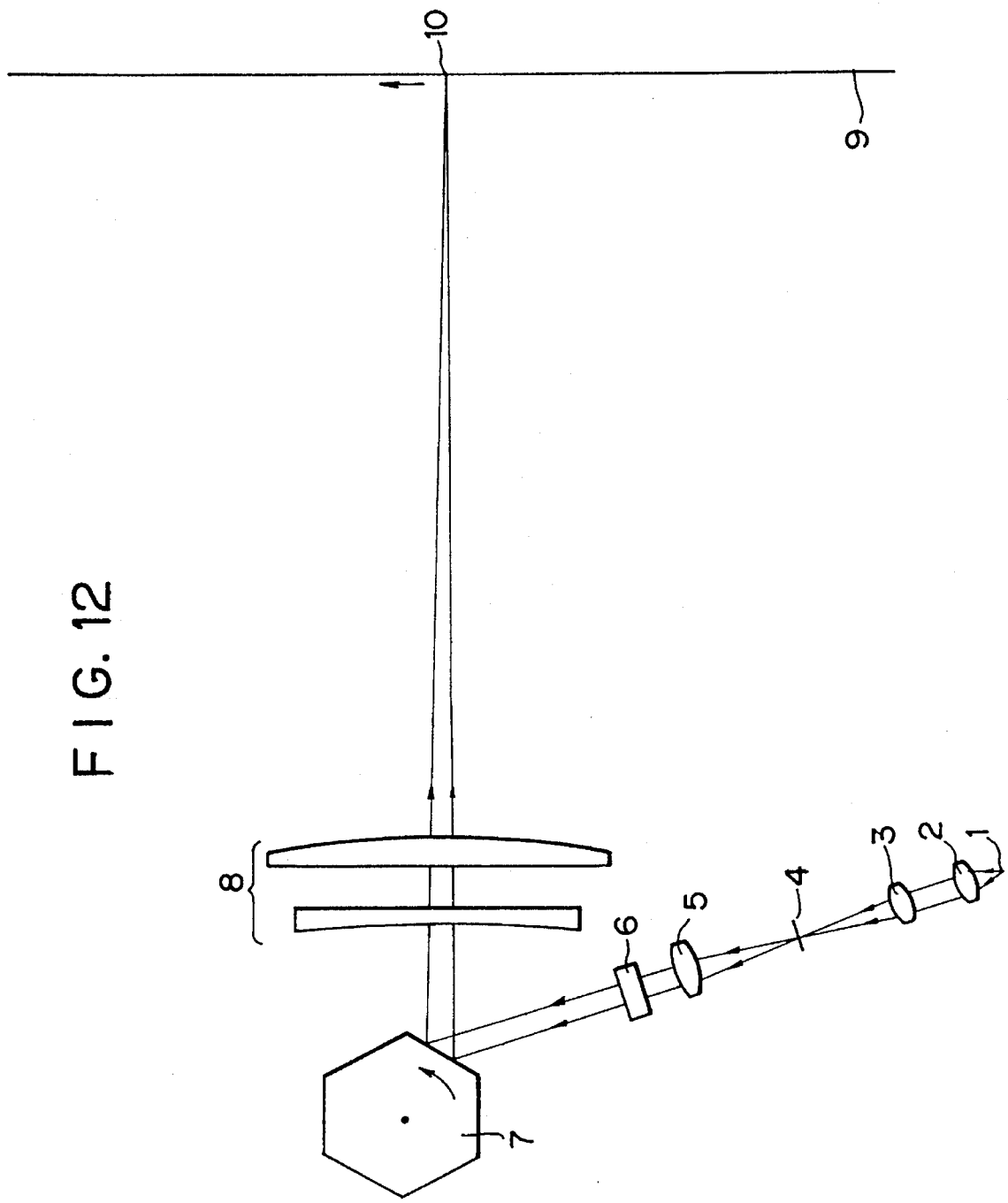
FIG. 12 is a schematic view of a first embodiment in which the phase shift device of the present invention is applied to a scanning optical system.

FIG. 12 is a schematic view of a first embodiment of the laser apparatus employing the phase shift device of the present invention.

A light beam emitted from a light source unit 1, composed, for example, of a laser, is converted by a collimating lens 2 into a substantially parallel beam, which is condensed by a condenser lens 3 to form a beam waist in the vicinity of the focus position. A phase shift device 4 is positioned in the vicinity of the beam waist, and the light transmitted by the device 4 is converted by a collimating lens 5 into a parallel beam which enters a cylindrical lens 6 having a refractive power in the sub scanning direction. The cylindrical lens 6 focuses the light beam into a line along the sub scanning direction, whereupon the light beam enters and is reflected by a rotary polygon mirror 7. The light beam reflected and deflected by the polygon mirror 7 is transmitted by an f-θ lens system 8 to form a beam spot 10 on a scanned plane 9.

As the rotary polygon mirror 7 is rotated at a constant speed in a direction indicated by an arrow, the laser beam spot 10 performs a scanning motion on the scanned plane 9.

The present embodiment of the above-explained structure achieves, by the use of the phase shift device 4, the scanning of the scanned plane 9 with a smaller beam spot diameter, without sacrificing the depth of focus. In this manner there is obtained a laser apparatus capable of image formation or image reading with a high resolving power. Naturally a similar effect can be obtained with the phase shift device 21 shown in FIG. 7.

FIGS. 13 to 16 are schematic views showing 2nd to 5th embodiments of the laser apparatus employing the phase shift device of the present invention, wherein same components as those in the first embodiment shown in FIG. 12 are represented by same numbers.

Figure 13:
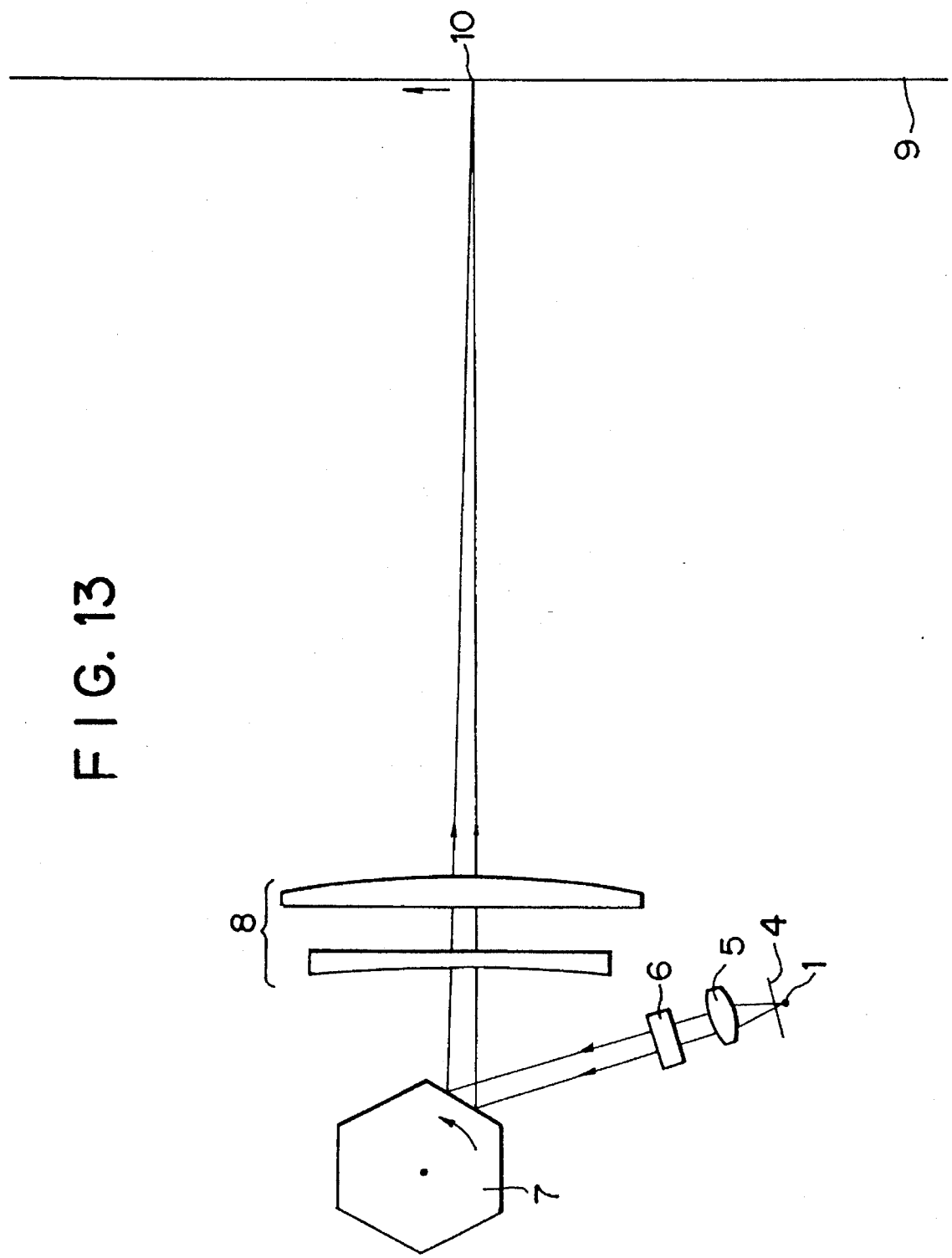
FIGS. 13 to 18 are schematic views of laser apparatus employing the phase shift device of the present invention and constituting 2nd to 7th embodiments.

In the 2nd embodiment shown in FIG. 13, the phase shift device 4 is positioned in the vicinity of a laser beam emitting end face of a semiconductor laser 1 constituting the light source. The laser beam, emitted from a light emission point of the semiconductor laser 1, is transmitted by the phase shift device 4 positioned in the vicinity thereof, then is converted by the collimating lens 2 into a parallel beam and enters the cylindrical lens 6. The structure thereafter is same as that in the 1st embodiment shown in FIG. 12.

In the present embodiment, since the position immediately after the beam emitting face of the semiconductor laser 1 is close to a beam waist, the phase shift device 4 is placed in the position, thereby reducing the beam spot diameter based on the aforementioned principle.

The present embodiment is simplified in the structure of the optical system, in comparison with the 1st embodiment shown in FIG. 12.

Figure 14:
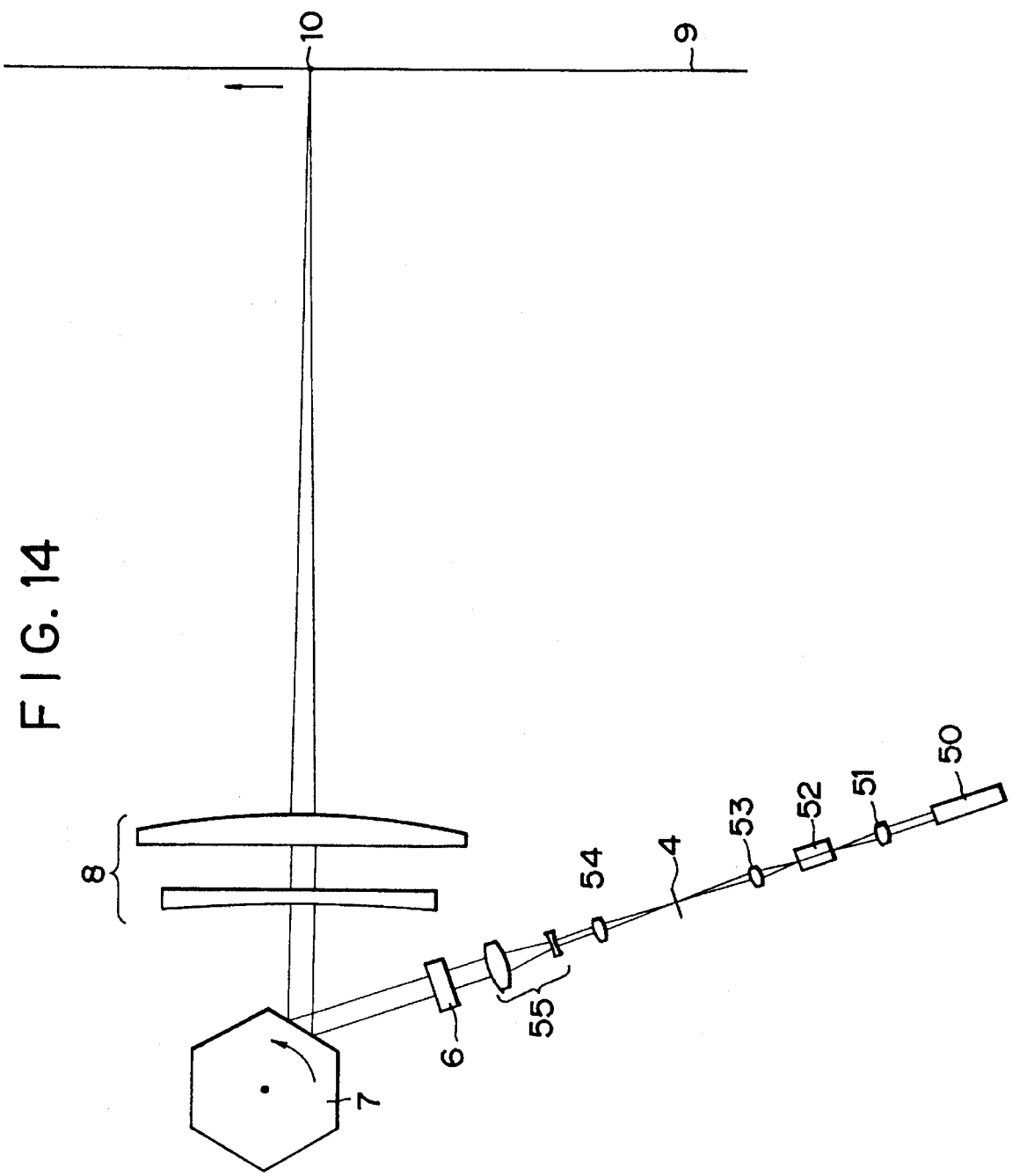

In the 3rd embodiment shown in FIG. 14, there are provided a light source unit 50 composed of a He-Ne laser; a first condenser lens 51; an A/O (acoustooptical) modulator 52; a second condenser lens 53; a collimating lens 54; and a beam expander 55. A laser beam emitted by the He-Ne laser 50 is focused by the first condenser lens 51, then subjected to intensity modulation by the A/O modulator 52 positioned in the vicinity of the focused point, and again focused by the second condenser lens 53.

The phase shift device 4 is positioned in the vicinity of a beam waist thus formed. The laser beam emerging from the device 4 is converted by the collimating lens 54 into a parallel beam, then subjected to a beam diameter expansion by the beam expander 55 and enters the cylindrical lens 6. The structure thereafter is same as that in the 1st embodiment shown in FIG. 120 and the beam spot 10 is formed on the scanned plane 9 in the same manner.

The present embodiment provides similar effects, in a laser apparatus employing a gas laser as the light source, as those in the foregoing embodiment, by condensing the laser beam from the gas laser with the second condenser lens 53 to form a beam waist and positioning the phase shift device of the aforementioned structure in the vicinity thereof.

Figure 15:
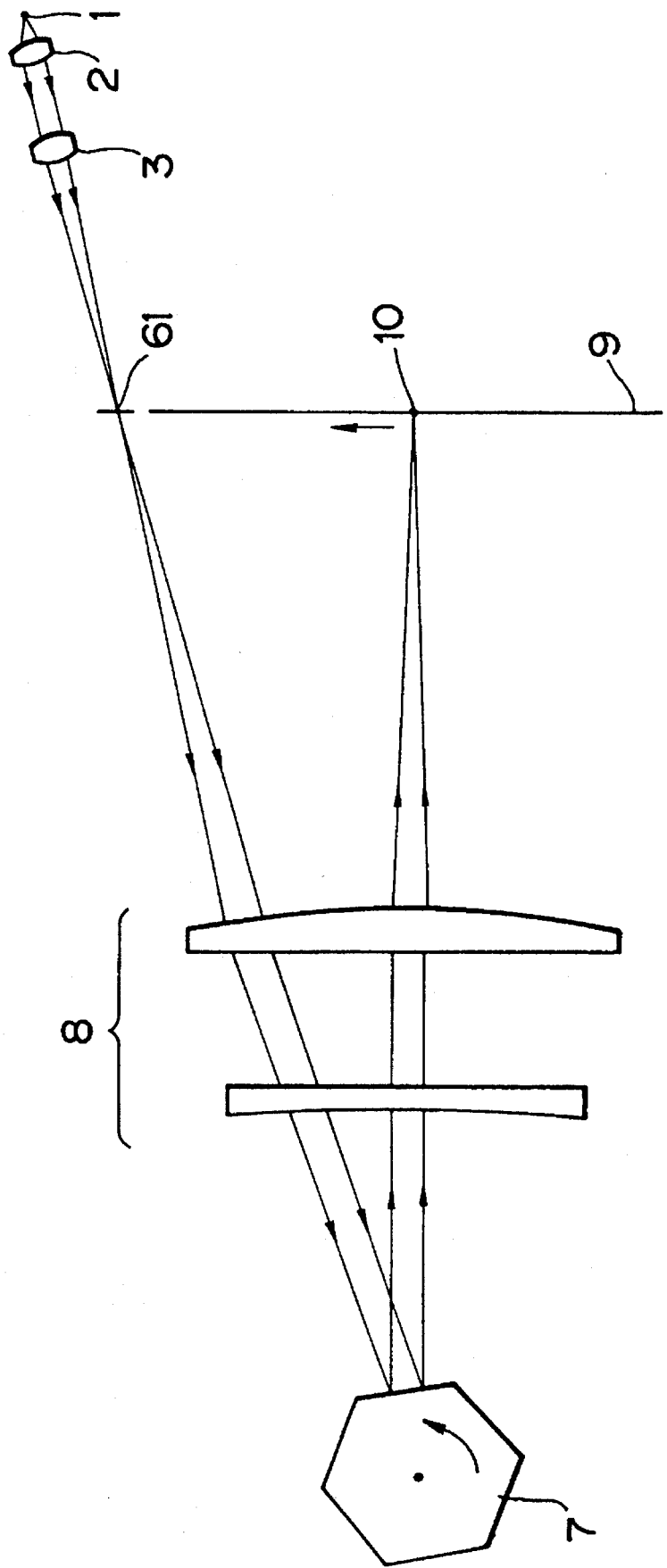

The 4th embodiment shown in FIG. 15 is featured by a fact that the laser beam from the light source 1 is introduced into the rotary polygon mirror 7, from the side of the scanned plane 9 through the f-θ lens system 8.

A transmissive phase shift device 61 is positioned substantially on the scanned plane 9.

In the present embodiment, the f-θ lens 8 constitutes an inclination correcting optical system in which the rotary polygon mirror and the scanned plane 9 are in a substantially conjugating relationship in the sub scanning direction. A laser beam emitted from a light emitting point of the semiconductor laser 1 is converted by a collimating lens 2 into a parallel beam, and is focused by a condenser lens 3 to form a beam waist in the vicinity of extension of the scanned plane 9.

The phase shift device 61 is positioned close to the beam waist. The device 61, receiving the laser beam from a diagonal direction, is so designed as to provide a difference of about a half wavelength in the optical path length between the laser beams transmitted by the two areas, for an incident laser beam with a certain diagonal angle. The laser beam emerging from the device 61 is transmitted by the f-θ lens 8 to form a linear image in the vicinity of a reflection face of the rotary polygon mirror 7, then reflected by the polygon mirror, and again transmitted by the f-θ lens 8 to form the beam spot 10 on the scanned plane 9. By the rotation of the polygon mirror 7 in the direction indicated by an arrow, the beam spot 10 performs a scanning motion, in a direction indicated by an arrow, on the scanned plane 9.

The present embodiment provides advantages that the optical system can be simplified by the absence of the cylindrical lens for forming a linear image, and that the manufacture of the phase shift device 61 is easy because the diameter of the beam waist formed in the vicinity of the phase shift device 61 is about as large as the beam spot diameter in the absence of the device.

Besides the present embodiment is featured by stable laser oscillation, because of the inclined entry of the laser beam into the phase shift device 61, whereby the beam reflected by the device scarcely returns to the semiconductor laser.

Figure 16:
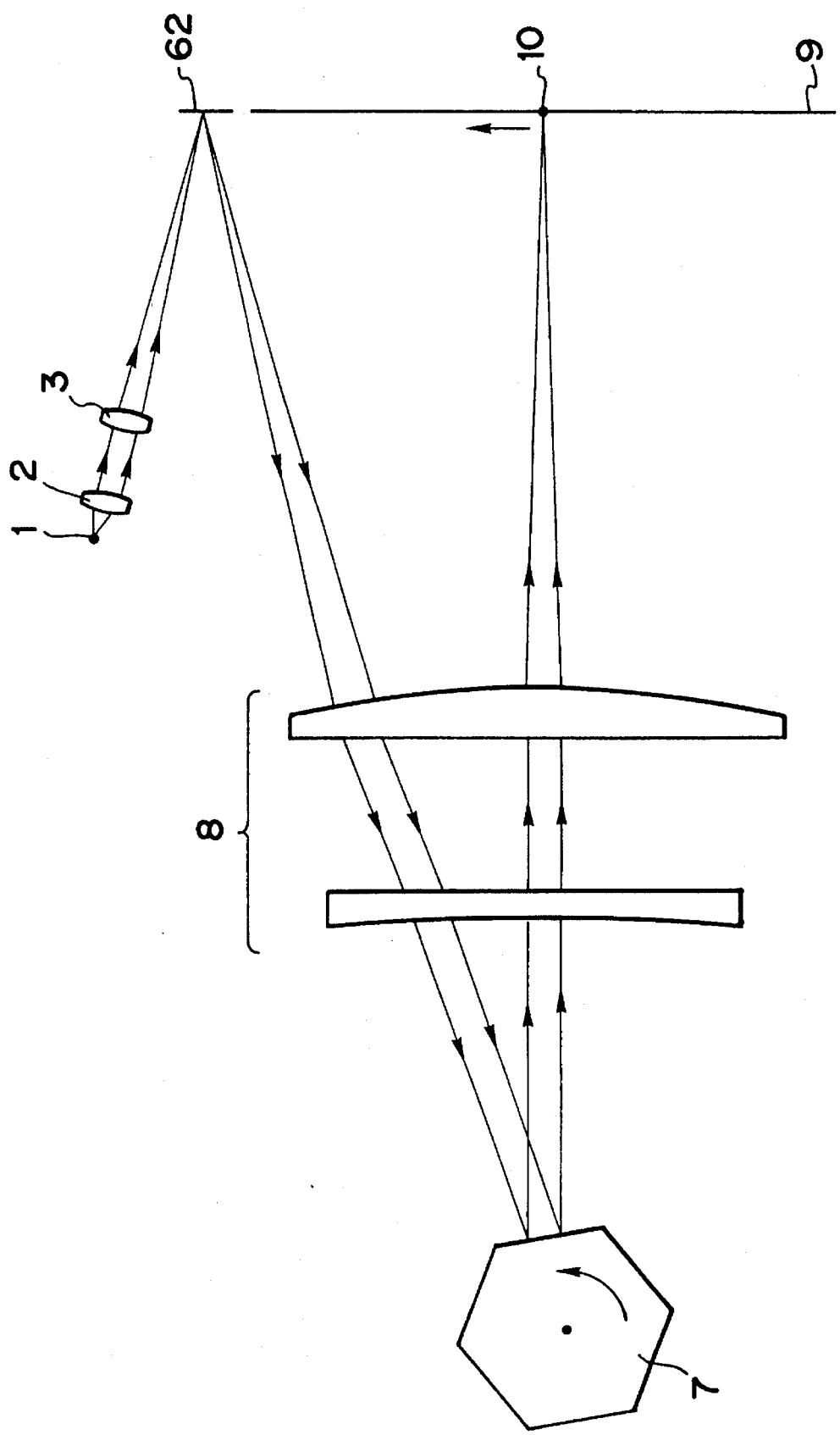

The 5th embodiment shown in FIG. 16 is same as the 4th embodiment shown in FIG. 15, except that the transmissive phase shift device in the latter is replaced by a reflective phase shift device.

The reflective phase shift device 62 of the present embodiment is so designed, for the incident laser beam with a predetermined incident angle, as to provide an optical path difference of a half wavelength between the laser beams transmitted by two areas. Such reflective phase shift device with an inclined incident beam enables compactization of the entire optical system and also enables stable laser oscillation because the reflected light does not returns to the laser.

Figure 17:
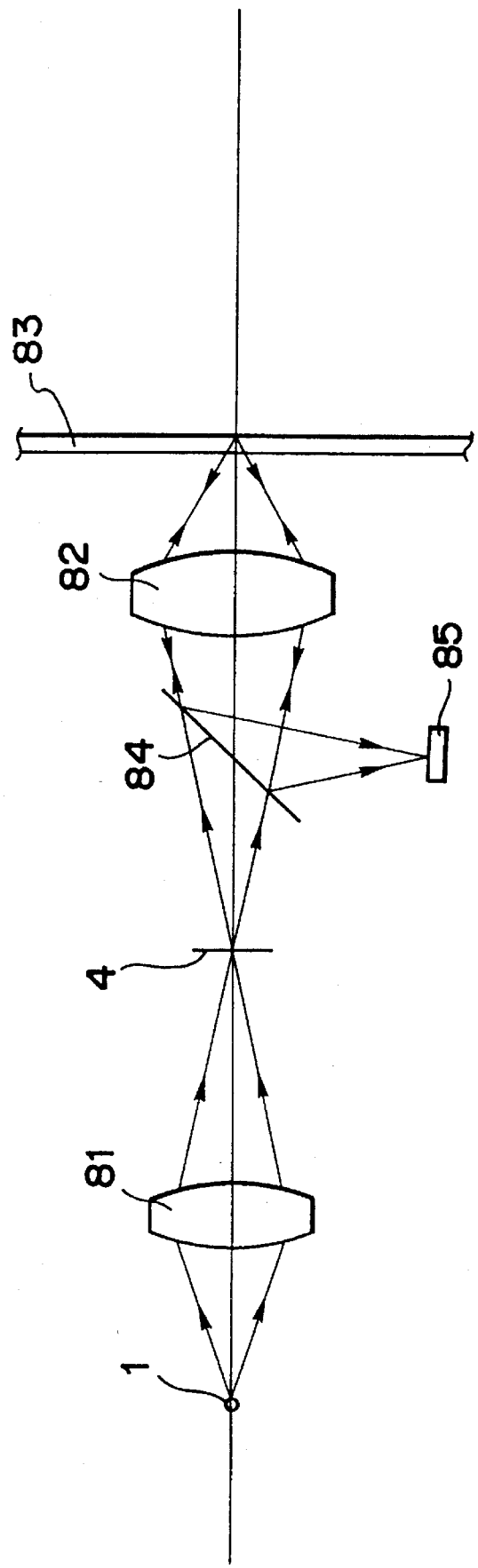

FIG. 17 is a schematic view of an optical system constituting the 6th embodiment in which the phase shift device of the present invention is applied to an optical pickup detection system for the optical memory.

A light beam emitted from a light source unit 1, composed for example of a laser, is condensed by a condenser lens 81 to form a beam waist in the vicinity of the focused position. The phase shift device 4 is positioned in the vicinity of the beam waist, and the beam emerging therefrom is transmitted by a beam splitter 84 and is condensed by an objective lens 82 to form a beam spot on an optical memory medium 83.

The present embodiment forms a small beam spot diameter on the surface of the optical memory medium 83 by the use of the phase shift device 4. The reflected light from the medium 83 is transmitted by the objective lens 82, reflected by the beam splitter 84 and enters a photodetector 85, which thus reads the signals on the optical memory medium 83 with a high density.

In the present embodiment a phase shift device 4 is positioned at the beam waist, but it is also possible to position the device in another position, for example in the vicinity of the light source 1, and to employ any number of the phase shift devices.

Figure 18:
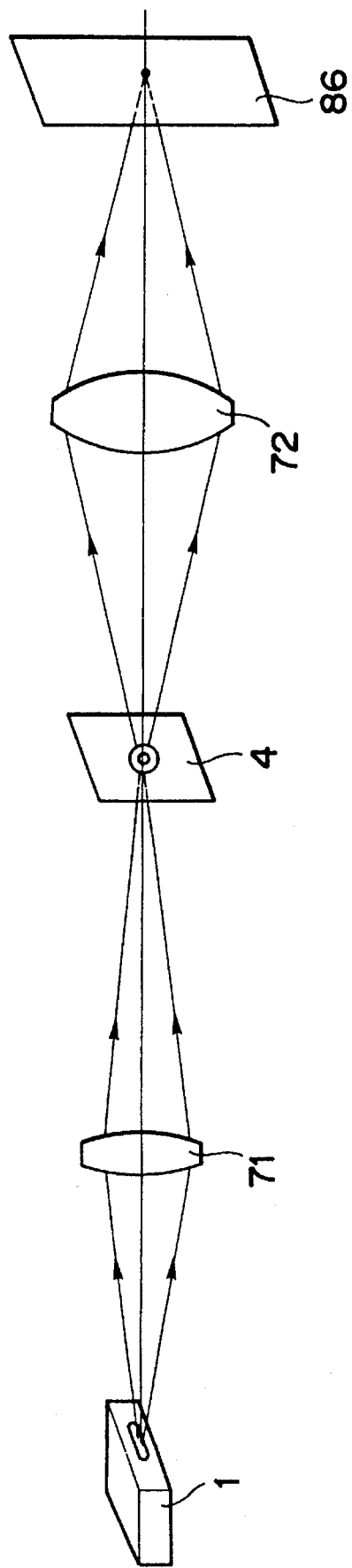
Figure 19C:
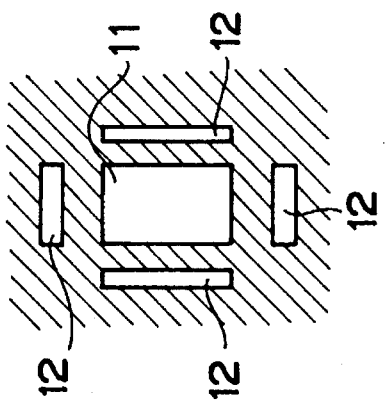
FIGS. 19A to 19F are views of other embodiments of the phase shift device of the present invention.
Figure 19F:
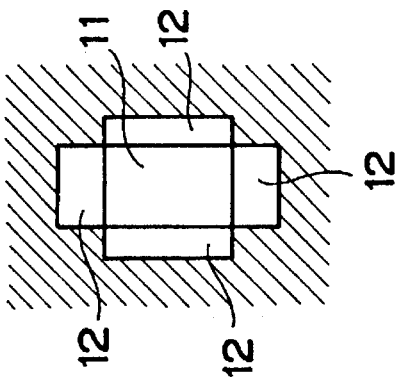
Figure 19B:
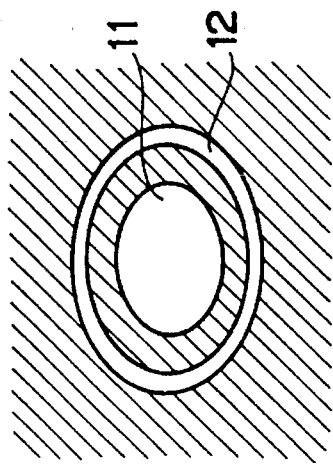
Figure 19E:
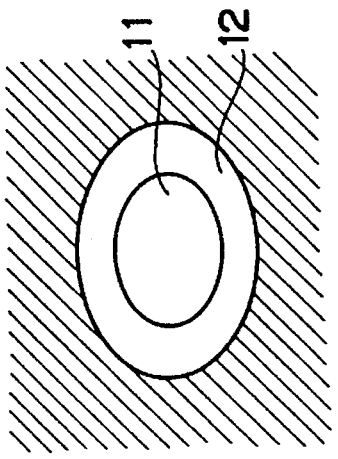
Figure 19A:
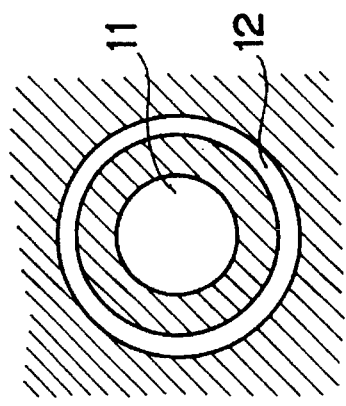
Figure 19D:
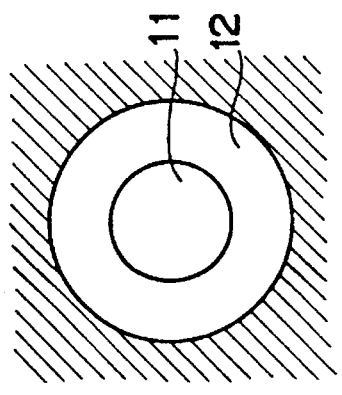

FIG. 18 is a schematic view of an optical system constituting the 7th embodiment in which the phase shift device of the present invention is utilized for correcting the astigmatism of the semiconductor laser.

A rotationally asymmetrical laser beam emitted from a light source unit 1 composed of a semiconductor laser is condensed by a first condenser lens 71 to form a beam spot of a rotationally asymmetrical form. A phase shift device 4 similar to that shown in FIGS. 3A, 3B are positioned in the vicinity of the beam spot. The phase shift device 4 is designed to provide a phase difference of 180° between the light beams transmitted by the first and second areas 11, 12 in FIG. 3B, and has parameters A=0.7 μm and B=2 μm. The laser beam transmitted by the phase shift device 4 is focused again by a second condenser lens 72 to form a beam spot on an image plane 86.

In the present embodiment, the light emitting face of the semiconductor laser 1, the phase shift device 4 and the image plane 86 are so positioned as to be mutually conjugate optically.

Also in the present embodiment, the light diverging point of the laser beam is shifted to the position of the phase shift device 4 both in the x- and y-directions, by the positioning of the phase shift device 4 in the vicinity of the focus point of the first condenser lens 21, as already explained above, whereby a satisfactory beam spot without astigmatism is obtained on the image plane 86.

In this manner the present embodiment allows to obtain a laser apparatus, adapted for use in various system and capable of providing a satisfactory beam spot without astigmatism, taking the phase shift device 4 as a new point light source.

The phase shift device to be employed in the foregoing embodiments need not be limited to the structure shown in FIG. 3A but can also be constructed as shown in FIGS. 19A to 19F.

In these drawings 11 indicates the first area; 12 indicates the second area; and hatching indicates the light shield area, and the first and second areas 11, 12 are so constructed to generate a phase difference of 180° (½ wavelength) between the passing light beams.

The laser apparatus of the present invention is applicable, in addition to those in the foregoing embodiments, for example to a laser beam printer, a laser microscope, a reticle exposure apparatus employing a scanning optical system etc.

As explained in the foregoing, the present invention, by positioning a phase shift device as explained in the foregoing in a predetermined position of an optical system, is capable of correcting the astigmatism of a laser beam in case of using a semiconductor laser, and forming a spot of a smaller diameter than that defined by the numerical aperture of the optical system while maintaining a large depth of focus, thereby achieving a higher resolving power for example in the image formation.

Different from the case of applying the phase shift method to the exposure apparatus (stepper) for semiconductor device manufacture, the present invention does not require formation of the phase shift area over the entire aperture patterns on the reticle. According to the present invention, the phase shift area needs only to be formed in an area close to the optical axis of the optical system, so that the structure of the entire apparatus can be significantly simplified.

What is claimed is:

1. A laser apparatus employing a phase shift device, comprising:

a laser light source for emitting a laser beam from a light emitting face thereof;

optical means for condensing the laser beam from the laser light source onto an image surface; and a phase shift device positioned proximate the light emitting face of said laser light source, said device including a first area transparent to the laser beam and a ring-shaped second area provided around said first area, said second area having a phase difference of 180° relative to light passing through said first area, said second area shifting the phase of the laser beam passing therethrough by a predetermined phase difference with respect to the laser beam passing through said first area such that light emerging from the phase shift device has a narrowed intensity distribution on said image surface.

2. A laser apparatus according to claim 1, wherein said beam waist is formed by condensing the laser beam emitted from said laser light source by means of a condensing optical system.

3. A laser apparatus according to claim 1, wherein the phase shift device is comprised by a parallel-faced flat transparent substrate having a thin film formed thereon in only one of the first area and the second area, the thin film having a thickness of $\lambda/\{2(n-1)\}$ where $\lambda$ is the predetermined wavelength and n is the refractive index of the film.

4. A laser apparatus according to claim 1, wherein for a normalized beam radius of $W_0=1.0$ μm, a radial distance of the second area is normalized to $B=2.0$ μm and a radial distance of the first area is normalized to $A=1.0$ μm or less.

5. A laser apparatus according to claim 4, wherein the laser beam has an oval-shaped cross-section and wherein the first area is correspondingly oval-shaped.

6. A laser apparatus according to claim 1, wherein light emerging from phase shift device has a predetermined phase shift between a center thereof and a periphery thereof.

7. A laser apparatus employing a phase shift device, comprising:

a laser light source for emitting a laser beam from a light emitting face thereof;

optical means for condensing the laser beam from the laser light source onto an image surface; and a phase shift device positioned proximate a position conjugate with the light emitting face, said device including a first area transparent to the laser beam and a ring-shaped second area provided around said first area, said second area having a phase difference of 180° relative to light passing through said first area, said second area shifting the phase of the laser beam passing therethrough by a predetermined phase difference with respect to the laser beam passing through said first area such that light emerging from the phase shift device has a narrowed intensity distribution on said image surface.

8. A laser apparatus according to claim 7, wherein the phase shift device is comprised by a parallel-faced flat transparent substrate having a thin film formed thereon in only one of the first area and the second area, the thin film having a thickness of $\lambda/\{2(n-1)\}$ where $\lambda$ is the predetermined wavelength and n is the refractive index of the film.

9. A laser apparatus according to claim 7, wherein for a normalized beam radius of $W_0=1.0$ μm, a radial distance of the second area is normalized to $B=2.0$ μm and a radial distance of the first area is normalized to $A=1.0$ μm or less.

10. A laser apparatus according to claim 9, wherein the laser beam has an oval-shaped cross-section and wherein the first area is correspondingly oval-shaped.

11. A laser apparatus according to claim 7, wherein light emerging from phase shift device has a predetermined phase shift between a center thereof and a periphery thereof.

12. A laser apparatus employing a phase shift device, comprising:

a laser light source for emitting a laser beam which is converged through a waisted region;

optical means for condensing the laser beam from the laser light source onto an image surface; and a phase shift device positioned proximate the waisted region of the laser beam, said device including a first area transparent to the laser beam and a ring-shaped second area provided around said first area, said second area having a phase difference of 180° relative to light passing through said first area, said second area shifting the phase of the laser beam passing therethrough by a predetermined phase difference with respect to the laser beam passing through said first area such that light emerging from the phase shift device has a narrowed intensity distribution on said image surface.

13. A laser apparatus according to claim 12, wherein the phase shift device is comprised by a parallel-faced flat transparent substrate having a thin film formed thereon in only one of the first area and the second area, the thin film having a thickness of $\lambda/\{2(n-1)\}$ where $\lambda$ is the predetermined wavelength and n is the refractive index of the film.

14. A laser apparatus according to claim 12, wherein for a normalized beam radius of $W_0=1.0$ μm, a radial distance of the second area is normalized to $B=2.0$ μm and a radial distance of the first area is normalized to $A=1.0$ μm or less.

15. A laser apparatus according to claim 14, wherein the laser beam has an oval-shaped cross-section and wherein the first area is correspondingly oval-shaped.

16. A laser apparatus according to claim 12, wherein light emerging from phase shift device has a predetermined phase shift between a center thereof and a periphery thereof.

17. A laser scanning apparatus employing a phase shift device, comprising:

a laser light source for emitting a laser beam;

optical means for condensing the laser beam from the laser light source onto an image surface;

a phase shift device arranged in a position between the laser light source and the optical means and including a first area transparent to the laser beam and a ring-shaped second area provided around said first area, said second area having a phase difference of 180° relative to light passing through said first area, said second area shifting the phase of the laser beam by a predetermined phase difference relative to the laser beam passing through the first area, the second area being provided around the first area, such that the laser beam emerging from the device has a narrowed intensity distribution on said image surface; and deflecting means for scanningly deflecting the laser beam from the phase shift device.

18. An apparatus according to claim 17, wherein the phase shift device is comprised by a parallel-faced flat transparent substrate having a thin film formed thereon in only one of the first area and the second area, the thin film having a thickness of $\lambda/\{2(n-1)\}$ where $\lambda$ is the predetermined wavelength and n is the refractive index of the film.

19. A laser apparatus according to claim 17, wherein for a normalized beam radius of $W_0=1.0$ μm, a radial distance of the second area is normalized to B=2.0 μm and a radial distance of the first area is normalized to A=1.0 μm or less.

20. A laser apparatus according to claim 19, wherein the laser beam has an oval-shaped cross-section and wherein the first area is correspondingly oval-shaped.

21. A laser scanning apparatus according to claim 17, wherein light emerging from phase shift device has a phase difference between a center portion thereof and a peripheral portion thereof.

22. A laser apparatus employing a phase shift device, comprising:

a laser light source for emitting a laser beam;

first optical means for condensing the laser beam from the laser light source;

a phase shift device arranged in a position where the laser beam is condensed by the first optical means and including a first area transparent to the laser beam and a ring-shaped second area provided around said first area, said second area having a phase difference of 180° relative to light passing through said first area, said second area shifting the phase of the laser beam by a predetermined phase difference relative to the laser beam passing through the first area, the second area being provided around the first area, such that the laser beam emerging from the device has a narrowed intensity distribution on an image surface; and second optical means for condensing the laser beam from the phase shift device onto said image surface.

23. An apparatus according to claim 22, wherein a light emitting face of the laser light source, the phase shift device and the image face are in optically conjugate relation with each other.

24. An apparatus according to claim 22, wherein the phase shift device is comprised by a parallel-faced flat transparent substrate having a thin film formed thereon in only one of the first area and the second area, the thin film having a thickness of $\lambda/\{2(n-1)\}$ where $\lambda$ is the predetermined wavelength and n is the refractive index of the film.

25. A laser apparatus according to claim 22, wherein for a normalized beam radius of $W_0=1.0$ μm, a radial distance of the second area is normalized to B=2.0 μm and a radial distance of the first area is normalized to A=1.0 μm or less.

26. A laser apparatus according to claim 25, wherein the laser beam has an oval-shaped cross-section and wherein the first area is correspondingly oval-shaped.

27. A laser scanning apparatus according to claim 22, wherein light emerging from phase shift device has a phase difference between a center portion thereof and a peripheral portion thereof.

28. A light pick-up apparatus employing a phase shift device, comprising:

a laser light source for emitting a laser beam;

first optical means for condensing the laser beam from the laser light source;

a phase shift device arranged in a position where the laser beam is condensed by the first optical means and including a first area transparent relative to the beam and a ring-shaped second area provided around said first area, said second area having a phase difference of 180° relative to light passing through said first area, said second area shifting the phase of the laser beam by a predetermined phase difference relative to the laser beam passing through the first area, the second area being provided around the first area, such that the laser beam emerging from the device has a narrowed intensity distribution on a recording medium;

second optical means for condensing the laser beam from the phase shift device onto said recording medium; and detecting means for detecting the laser beam from the recording medium.

29. An apparatus according to claim 28, wherein the phase shift device is comprised by a parallel-faced flat transparent substrate having a thin film formed thereon in only one of the first area and the second area, the thin film having a thickness of $\lambda/\{2(n-1)\}$ where $\lambda$ is the predetermined wavelength and n is the refractive index of the film.

30. A laser apparatus according to claim 28, wherein for a normalized beam radius of $W_0=1.0$ μm, a radial distance of the second area is normalized to B=2.0 μm and a radial distance of the first area is normalized to A=1.0 μm or less.

31. A laser apparatus according to claim 30, wherein the laser beam has an oval-shaped cross-section and wherein the first area is correspondingly oval-shaped.

32. A light pick-up apparatus according to claim 28, wherein light emerging from phase shift device has a phase difference between a center portion thereof and a peripheral portion thereof.

33. A laser scanning apparatus employing a phase shift device, comprising:

a laser light source for emitting a laser beam;

optical means for condensing the laser beam from the laser light source onto an image surface; and a phase shift device arranged in a position between the laser light source and the optical means and including a first area transparent to the laser beam and a ring-shaped second area provided around said first area, said second area having a phase difference of 180° relative to light passing through said first area, said second area shifting the phase of the laser beam by a predetermined phase difference relative to the laser beam by a predetermined phase difference relative to the laser beam passing through the first area, the second area being provided around the first area, such that the laser beam emerging from the device has a narrowed intensity distribution on said image surface.

34. A laser scanning apparatus according to claim 33, wherein light emerging from phase shift device has a phase difference between a center portion thereof and a peripheral portion thereof.

35. A laser scanning apparatus according to claim 33, wherein for a normalized beam radius of $W_0=1.0$ μm, a radial distance of the second area is normalized to B=2.0 μm and a radial distance of the first area is normalized to A=1.0 μm or less.

36. A laser apparatus according to claim 35, wherein the laser beam has an oval-shaped cross-section and wherein the first area is correspondingly oval-shaped.

37. A laser scanning apparatus according to claim 33, wherein the phase shift device is comprised by a parallel-faced flat transparent substrate having a thin film formed thereon in only one of the first area and the second area, the thin film having a thickness of $\lambda/\{2(n-1)\}$ where $\lambda$ is the predetermined wavelength and n is the refractive index of the film.

* * * * *

UNITED STATES PATENT AND TRADEMARK OFFICE
CERTIFICATE OF CORRECTION

PATENT NO. : 5,477,554

DATED : December 19, 1995

INVENTOR(S): Minoru Yoshii, et al.

Page 1 of 3

It is certified that error appears in the above-identified patent and that said Letters Patent is hereby corrected as shown below:

On the cover page, change the spelling of the first named inventor from "Minouru Yoshii" to --Minoru Yoshii--.

In the abstract, line 2, change "so" to --to--.

Column 1, line 23, change "capable" to --the capability--.

Column 4, line 56, delete "10".

Column 5, line 36, change "10 The" to --The--; and
line 61, change "light-hand" to --right-hand--.

Column 9, line 1, change "$U_0^+(x,0)xT(x,0)$." to --$U_0^+(x,0)=U_0^-(x,0)xT(x,0)$.--

Column 11, line 10, change "FIG. 120" to --FIG. 12,--; and
line 54, change "Besides" to --In addition--.

Column 12, line 2, change "returns" to --return--; and
line 55, change "system" to --systems--.

UNITED STATES PATENT AND TRADEMARK OFFICE
CERTIFICATE OF CORRECTION

PATENT NO. : 5,477,554

DATED : December 19, 1995

INVENTOR(S): Minoru Yoshii, et al.

It is certified that error appears in the above-identified patent and that said Letters Patent is hereby corrected as shown below:

Column 13, line 42, change "Claim 1" to --Claim 12--; and
    line 59, change "from phase" to --from the phase--.

Column 14, line 25, change "from phase" to --from the phase--; and
    line 59, change "from phase" to --from the phase--.

Column 15, line 12, change "An apparatus" to --A laser scanning apparatus--;
    line 17, change "A laser apparatus" to --A laser scanning apparatus--;
    line 21, change "A laser apparatus" to --A laser scanning apparatus--;
    line 25, change "from phase" to --from the phase--;
    line 48, change "An apparatus" to --A laser apparatus--;
    line 52, change "An apparatus" to --A laser apparatus--;
    line 65, delete "scanning"; and
    line 66, change "from phase" to --from the phase--.

UNITED STATES PATENT AND TRADEMARK OFFICE
CERTIFICATE OF CORRECTION

PATENT NO. : 5,477,554

DATED : December 19, 1995

INVENTOR(S) : Minoru Yoshii, et al.

Page 3 of 3

It is certified that error appears in the above-identified patent and that said Letters Patent is hereby corrected as shown below:

```
        Column 16, line 29, change "A laser" to --An
apparatus--;
                  line 33, change "A laser" to --An
apparatus--;
                  line 37, change "from phase" to --from
the phase--; and
                  line 60, change "from phase" to --from
the phase--.

Column 17, line 1, change "laser apparatus" to
--laser scanning apparatus--.
```

Signed and Sealed this

Twenty-third Day of April, 1996

*Attest:*

BRUCE LEHMAN

*Attesting Officer*   Commissioner of Patents and Trademarks

UNITED STATES PATENT AND TRADEMARK OFFICE
CERTIFICATE OF CORRECTION

PATENT NO. : 5,477,554

DATED : December 19, 1995

INVENTOR(S) : Minoru Yoshii, et al.

It is certified that error appears in the above-identified patent and that said Letters Patent is hereby corrected as shown below:

On the title page, item [75]    change the spelling of the first named inventor from "Minour Yoshii" to --Minoru Yoshii--.

Signed and Sealed this

Twenty-ninth Day of July, 1997

Attest:

BRUCE LEHMAN

Attesting Officer

Commissioner of Patents and Trademarks